US012591861B2

(12) United States Patent
Domakhina et al.

(10) Patent No.: US 12,591,861 B2
(45) Date of Patent: Mar. 31, 2026

(54) RISK MANAGEMENT BASED WORK ORDER PRIORITIZATION

(71) Applicant: Rockwell Automation Technologies, Inc., Mayfield Heights, OH (US)

(72) Inventors: Liudmila Domakhina, Toronto (CA); Mohammad Esmalifalak, Toronto (CA); Stuart Fergusson, Toronto (CA); Min Hua Yu, Toronto (CA); Hyo Jung S Son, Calgary (CA); Tareq Al-Masri, Toronto (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 18/824,641

(22) Filed: Sep. 4, 2024

(65) Prior Publication Data

US 2026/0065234 A1     Mar. 5, 2026

(51) Int. Cl.
G06Q 10/20          (2023.01)
G06Q 10/04          (2023.01)
(Continued)

(52) U.S. Cl.
CPC ............. G06Q 10/20 (2013.01); G06Q 10/04 (2013.01); G06Q 10/0635 (2013.01); G06Q 10/087 (2013.01)

(58) Field of Classification Search
CPC .... G06Q 10/20; G06Q 10/04; G06Q 10/0635; G06Q 10/087
See application file for complete search history.

(56)                References Cited

U.S. PATENT DOCUMENTS 6,578,005 B1     6/2003  Lesaint et al.
8,209,205 B1     6/2012  McElroy et al.
(Continued)

FOREIGN PATENT DOCUMENTS

AU       2021269407 A1     6/2022
CN        114063512 A       2/2022
(Continued)

OTHER PUBLICATIONS

Extended European Search Report received for European Patent Application Serial No. 25159641.7 dated Jul. 23, 2025, 11 pages.
(Continued)

*Primary Examiner* — Lindsay M Maguire
(74) *Attorney, Agent, or Firm* — Amin, Turocy & Watson, LLP

(57)                ABSTRACT

A work order management system automates the process of scheduling maintenance tasks and generating corresponding work orders via analysis of monitored data generated by the industrial assets. The work order management system can monitor status and operational data from industrial devices on the plant floor and initiate creation of work orders based on a determination that the monitored industrial data indicates a current or predicted performance risk requiring investigation or maintenance. The system can leverage generative artificial intelligence (AI) or other types of AI in connection with determining when and how to schedule a maintenance task intended to mitigate asset risk. The system dynamically updates the work orders in response to changing contextual conditions within the plant to ensure that work order priority, scheduling, and resource allocations satisfy a defined maintenance optimization criterion.

20 Claims, 14 Drawing Sheets

(51) Int. Cl.
    *G06Q 10/0635*     (2023.01)
    *G06Q 10/087*     (2023.01)

(56)            References Cited

U.S. PATENT DOCUMENTS

| | | | |
|---|---|---|---|
| 10,242,349 | B1 | 3/2019 | Arya et al. |
| 10,318,570 | B2 | 6/2019 | Billi-Duran et al. |
| 10,319,128 | B2 | 6/2019 | Billi-Duran et al. |
| 11,017,321 | B1 | 5/2021 | Mishra et al. |
| 2002/0007297 | A1 | 1/2002 | Clarke |
| 2002/0156542 | A1 | 10/2002 | Nandi |
| 2004/0243636 | A1 | 12/2004 | Hasiewicz et al. |
| 2008/0288321 | A1 | 11/2008 | Dillon et al. |
| 2010/0039247 | A1 | 2/2010 | Ziegler et al. |
| 2010/0312605 | A1 | 12/2010 | Mitchell et al. |
| 2012/0259540 | A1 | 10/2012 | Kishore et al. |
| 2012/0290104 | A1 | 11/2012 | Holt et al. |
| 2014/0336791 | A1 | 11/2014 | Asenjo et al. |
| 2014/0336795 | A1 | 11/2014 | Asenjo et al. |
| 2014/0337277 | A1 | 11/2014 | Asenjo et al. |
| 2015/0134387 | A1 | 5/2015 | Heinonen et al. |
| 2015/0348051 | A1 | 12/2015 | Bodda et al. |
| 2017/0011352 | A1 | 1/2017 | Jones-McFadden et al. |
| 2017/0277920 | A1 | 9/2017 | DeYoung et al. |
| 2017/0351226 | A1 | 12/2017 | Bliss et al. |
| 2018/0052835 | A1 | 2/2018 | Billi-Duran et al. |
| 2018/0088566 | A1 | 3/2018 | Billi-Duran et al. |
| 2018/0089870 | A1 | 3/2018 | Billi-Duran et al. |
| 2018/0253701 | A1 | 9/2018 | Wright et al. |
| 2019/0108747 | A1 | 4/2019 | Stenning et al. |
| 2019/0251832 | A1 | 8/2019 | Longhenry et al. |
| 2019/0325660 | A1 | 10/2019 | Schmirler et al. |
| 2019/0377817 | A1 | 12/2019 | McCluskey et al. |
| 2020/0042954 | A1 | 2/2020 | Parris |
| 2020/0079403 | A1* | 3/2020 | Setiawan ............. B61L 15/0018 |
| 2020/0125084 | A1* | 4/2020 | Harder ..................... A47C 9/10 |
| 2020/0133257 | A1 | 4/2020 | Cella et al. |
| 2020/0184407 | A1 | 6/2020 | Mappus et al. |
| 2020/0210912 | A1 | 7/2020 | Buhulaiga et al. |
| 2020/0336707 | A1 | 10/2020 | Schmirler et al. |
| 2020/0401124 | A1 | 12/2020 | Dillon et al. |
| 2021/0019690 | A1 | 1/2021 | Gordenker et al. |
| 2021/0132591 | A1 | 5/2021 | Lu |
| 2021/0192413 | A1 | 6/2021 | Shirazipour et al. |
| 2021/0374092 | A1 | 12/2021 | Sahay |
| 2022/0004672 | A1 | 1/2022 | Santarone et al. |
| 2022/0066415 | A1 | 3/2022 | Miller et al. |
| 2022/0129828 | A1 | 4/2022 | Yates et al. |
| 2022/0176544 | A1 | 6/2022 | Chandler et al. |
| 2022/0198565 | A1 | 6/2022 | Krishnaswamy et al. |
| 2022/0230125 | A1 | 7/2022 | Vedantam et al. |
| 2022/0398665 | A1 | 12/2022 | Jayathirtha et al. |
| 2022/0412845 | A1 | 12/2022 | Raveendran et al. |
| 2023/0027594 | A1 | 1/2023 | Esmalifalak et al. |
| 2023/0090297 | A1 | 3/2023 | Jadhav et al. |
| 2023/0123527 | A1 | 4/2023 | Michael et al. |
| 2023/0244192 | A1 | 8/2023 | Thondarampattu Vasudevan et al. |
| 2023/0259893 | A1 | 8/2023 | Janey et al. |
| 2023/0376847 | A1 | 11/2023 | Travalini et al. |
| 2023/0418281 | A1 | 12/2023 | Lee et al. |
| 2024/0004358 | A1 | 1/2024 | Mueller, III et al. |
| 2024/0201680 | A1 | 6/2024 | Fluchel |
| 2024/0378534 | A1* | 11/2024 | Honey ............... G06Q 10/0635 |
| 2025/0060717 | A1 | 2/2025 | Raisoni et al. |
| 2025/0077997 | A1 | 3/2025 | Morris et al. |

FOREIGN PATENT DOCUMENTS

| | | |
|---|---|---|
| EP | 2 801 938 A1 | 11/2014 |
| EP | 2 942 717 A1 | 11/2015 |
| JP | 2018077757 A | 5/2018 |

OTHER PUBLICATIONS

Extended European Search Report received for European Patent Application Serial No. 25189272.5 dated Oct. 7, 2025, 10 pages.

Abbassi et al., "Risk-Based and Predictive Maintenance Planning of Engineering Infrastructure: Existing Quantitative Techniques and Future Directions", Process Safety and Environmental Protection, vol. 165, Jul. 27, 2022, pp. 776-790.

Daryani et al., "asTech Insights: The GenAI approach to Customized Collision Repair Recommendations", 2024 IEEE Intelligent Vehicles Symposium (IV), Jun. 2, 2024, pp. 1921-1926.

Non-Final Office Action received for U.S. Appl. No. 18/787,157 dated Nov. 4, 2025, 26 pages.

Bhanji et al. "Advanced Enterprise Asset Management Systems: Improve Predictive Maintenance and Asset Performance by Leveraging Industry 4.0 and the Internet of Things (IoT)", ASME Joint Rail Conference, 2021, 10 pages.

Extended European Search Report received for European Patent Application Serial No. 25187800.5 dated Oct. 27, 2025, 11 pages.

Non-Final Office Action received for U.S. Appl. No. 18/829,799 dated Janaury 20, 2026, 26 pages.

Non-Final Office Action received for U.S. Appl. No. 18/811,443 dated Dec. 23, 2025, 32 pages.

Ravichandran, Dr. S., "Optimization of Maintenance Management of Plants", International Journal of Mechanical Engineering and Technology (IJMET), vol. 1, Issue 2006, Jan.-Dec. 2006, pp. 15-21.

Non-Final Office Action received for U.S. Appl. No. 18/811,412 dated Jan. 26, 2026, 21 pages.

* cited by examiner

RISK MANAGEMENT BASED WORK ORDER PRIORITIZATION

BACKGROUND

The subject matter disclosed herein relates generally to industrial maintenance, and, more specifically, to industrial work order generation and planning.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising memory that stores executable components and work order data defining open work orders for performing maintenance tasks on industrial assets within an industrial facility; and a processor, operatively coupled to the memory, that executes the executable components, the executable components comprising: a user interface configured to receive, via interaction with a user interface rendered by the user interface component, inspection result data indicating results of an inspection performed on an industrial machine within the industrial facility; an analysis component configured to, in response to determining that the inspection result data is indicative of a performance risk associated with the industrial machine, formulate one or more maintenance tasks designed to mitigate the performance risk; and a work order generation component configured to generate a work order to perform the one or more maintenance tasks, wherein the analysis component is further configured to determine a modification to an open work order, of the open work orders, that causes the open work orders to satisfy a defined maintenance optimization criterion based on the performance risk associated with the industrial machine, and the work order generation component is further configured to implement the modification to the open work order.

Also, one or more embodiments provide a method, comprising maintaining, by a system comprising a processor, open work orders for performing maintenance tasks on industrial assets within an industrial facility; receiving, by the system via interaction with a user interface, inspection result data indicating results of an inspection performed on an industrial machine within the industrial facility; and in response to determining that the inspection result data is indicative of a performance risk associated with the industrial machine: formulating, by the system, one or more maintenance tasks designed to mitigate the performance risk; generating, by the system, a work order to perform the one or more maintenance tasks; determining, by the system, a modification to an open work order, of the open work orders, that causes the open work orders to satisfy a defined maintenance optimization criterion based on the performance risk associated with the industrial machine; and implementing, by the system, the modification to the open work order.

Also, according to one or more embodiments, a non-transitory computer-readable medium is provided having stored thereon instructions that, in response to execution, cause a work order management system to perform operations, the operations comprising maintaining open work orders for performing maintenance tasks on industrial assets within an industrial facility; receiving, via interaction with a user interface rendered by the user interface component, inspection result data indicating results of an inspection performed on an industrial machine within the industrial facility; and in response to determining that the inspection result data is indicative of a performance risk associated with the industrial machine: formulating one or more maintenance tasks designed to mitigate the performance risk; generating a work order to perform the one or more maintenance tasks; determining a modification to an open work order, of the open work orders, that causes the open work orders to satisfy a defined maintenance optimization criterion based on the performance risk associated with the industrial machine; and implementing the modification to the open work order.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
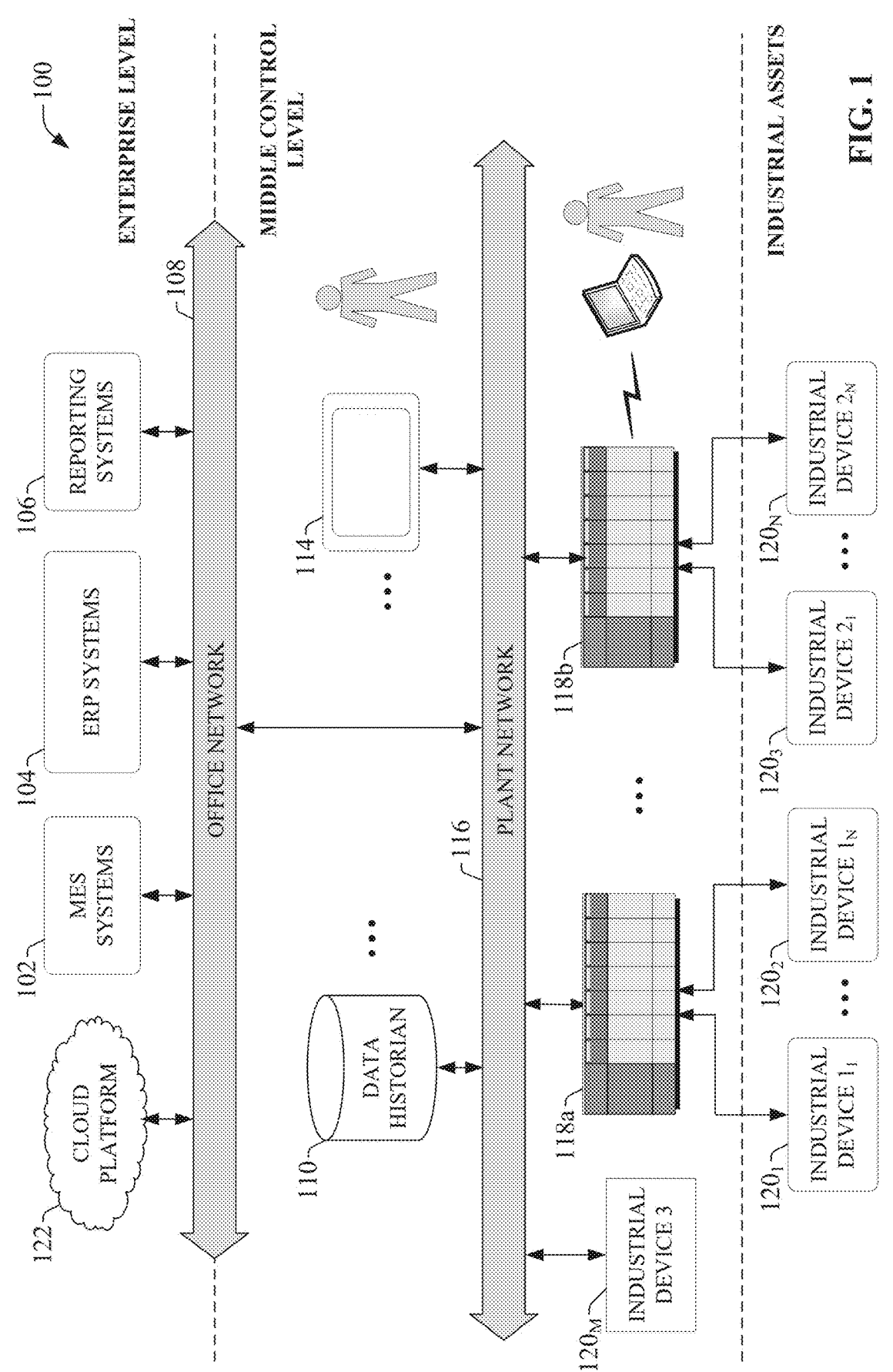
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. These higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level in view of higher-level business considerations, driving those control-level operations toward outcomes that satisfy defined business goals (e.g., order fulfillment, resource tracking and management, asset utilization tracking, etc.). Reporting systems 106 can collect operational data from industrial devices on the plant floor and generate daily or shift reports that summarize operational statistics of the controlled industrial assets Industrial facilities typically house and operate many industrial assets, machines, or equipment. Many of these assets require regular proactive maintenance to ensure continued optimal operation, in addition to unplanned repair operations to address unexpected downtime events, such as machine malfunctions. To manage the large number of maintenance operations carried out at a given industrial enterprise, work order management systems can be used to initiate work orders for new maintenance operations to be performed, to track the statuses of these work orders, and to keep a record of maintenance operations performed within the plant. In a typical scenario for addressing a reactive maintenance concern, when metered or observed asset performance indicators—e.g., vibration values, temperature values, product counts, a machine downtime occurrence, etc.—indicate a possible performance concern requiring investigation or maintenance, a maintenance technician or manager creates and submits a work order for the maintenance operation to the work order management system. Maintenance personnel are then assigned the task of performing the maintenance task or investigation. As the work is carried out, maintenance actions performed in connection with the schedule maintenance task are submitted and recorded with the work order, which remains open as its corresponding maintenance task is performed. The work order is then closed once the task is completed. A similar workflow can be used to schedule regular proactive or preventative maintenance on industrial assets.

This approach to maintenance management requires operators, maintenance staff, or supervisors to visually observe when machine performance indicators, or predetermined asset maintenance schedules, necessitate scheduling of a maintenance action and creation of a corresponding work order for the maintenance task. If a performance concern is observed or a preventative maintenance task to be scheduled, the work order must be created by a maintenance supervisor or technician so that the maintenance work is properly logged and tracked. The process of manually creating and submitting work orders is susceptible to errors due to improperly entered work order information. Errors in the work order submission process are common, and these errors may have associated risks that directly affect the underlying industrial assets on which maintenance is performed, or that adversely affect future decisions made by the industrial enterprise.

Moreover, manual ad hoc approaches to scheduling maintenance actions may not consider relevant contextual factors such as availability of tools, materials, or technicians, or changes in the operational or heath statuses of industrial assts that may merit a modification to a current maintenance schedule in order to optimize time, effort, and resources.

To address these and other issues, one or more embodiments described herein provide a work order management system that automates the process of scheduling maintenance tasks and generating corresponding work orders via analysis of monitored data generated by the industrial assets. In one or more embodiments, the work order management system can monitor control, status, and/or operational data from industrial devices on the plant floor, and initiate creation of work orders based on a determination that the monitored industrial data indicates a current or predicted performance risk requiring investigation or maintenance. In some embodiments, the work order management system can leverage generative artificial intelligence (AI) or other types of AI in connection with determining when and how to schedule a maintenance task intended to mitigate asset risk. The work order management system can also dynamically modify current maintenance scheduling strategies as needed based on current availabilities of technicians, tools, materials, or other resources, as well as current statuses of the industrial assets themselves.

Figure 2:
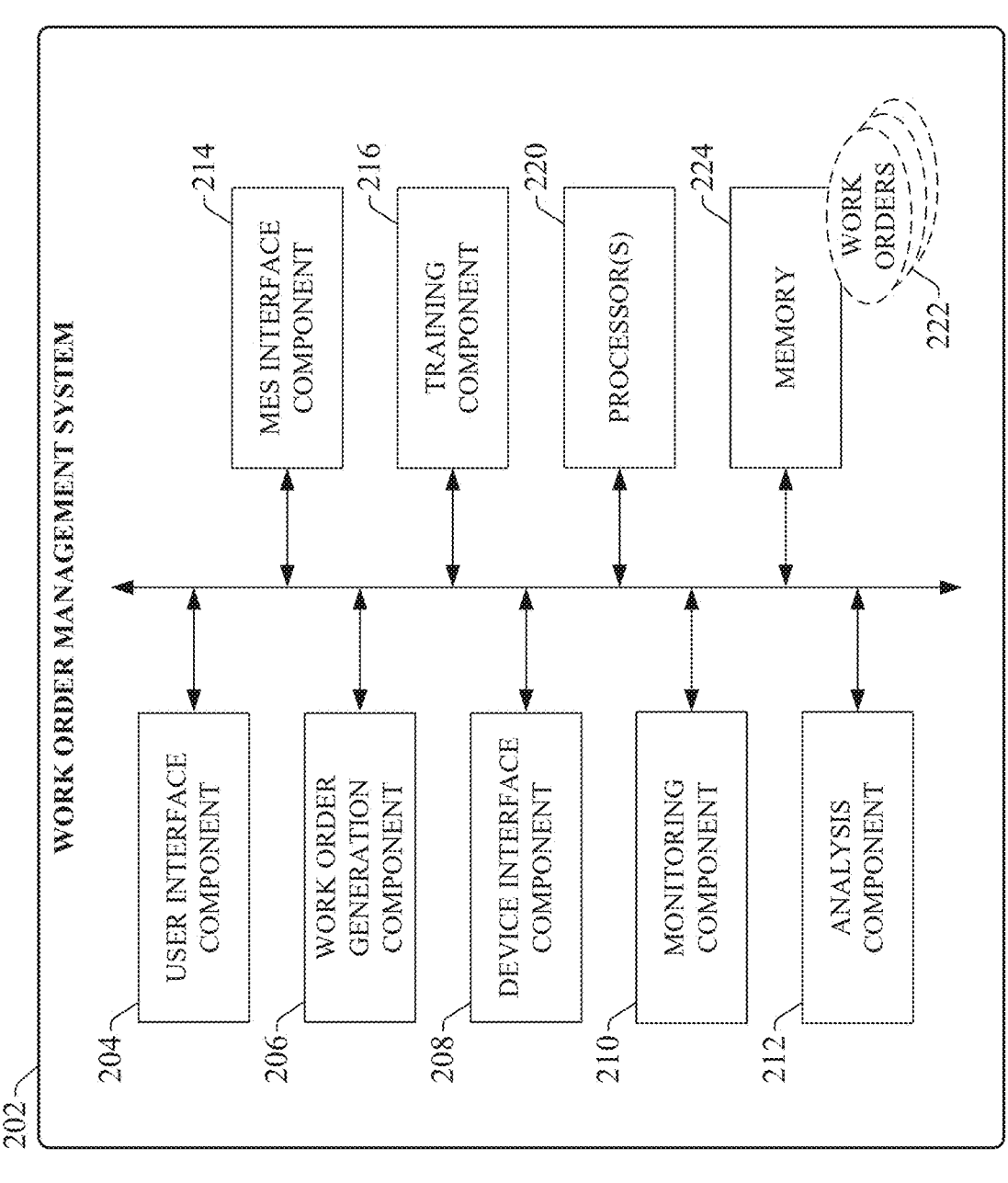
FIG. 2 is a block diagram of a work order management system.

FIG. 2 is a block diagram of a work order management system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Work order management system 202 can include a user interface component 204, a work order generation component 206, a device interface component 208, a monitoring component 210, an analysis component 212, an MES interface component 214, a training component 216 one or more processors 220, and memory 224. In various embodiments, one or more of the user interface component 204, work order generation component 206, device interface component 208, monitoring component 210, analysis component 212, MES interface component 214, training component 216, the one or more processors 220, and memory 224 can be electrically and/or communicatively coupled to one another to perform one or more of the functions of the work order management system 202. In some embodiments, components 204, 206, 208, 210, 212, 214, and 216 can comprise software instructions stored on memory 224 and executed by processor(s) 218. Work order management system 202 may also interact with other hardware and/or software components not depicted in FIG. 2. For example, processor(s) 220 may interact with one or more external user interface devices, such as a keyboard, a mouse, a display monitor, a touchscreen, or other such interface devices.

User interface component 204 can be configured to generate user interface displays that receive user input and render output to the user in any suitable format (e.g., visual, audio, tactile, etc.). In some embodiments, user interface component 204 can render these interface displays on a client device (e.g., a laptop computer, tablet computer, smart phone, etc.) that is communicatively connected to the work order management system 202 (e.g., via a hardwired or wireless connection). Input data that can be received via user interface component 204 can include, but is not limited to, work order data (e.g., work order data field entries), user interface navigation input, or other such input data. Output data rendered by user interface component 204 can include, but is not limited to, information regarding closed and open work orders, maintenance planning recommendations or guidance, recommended workflows for performing a maintenance task defined by a work order, results of maintenance tracking analysis, optimized maintenance routes, or other such output data.

Work order generation component 206 can be configured to generate work orders 222 based on user-submitted information about a maintenance task to be performed, or based on detected or predicted asset risks. In some embodiments, the work order generation component 206 can generate work orders and schedule corresponding maintenance tasks based on analysis performed by the analysis component 212, which can also be assisted using generative AI.

Device interface component 208 can be configured to interface with industrial devices or assets on the plant floor, either directly or via a gateway or edge device, and receive real-time operational and status data from these assets for the purposes of asset health monitoring and analysis. Device interface component 208 can also receive data from mobile industrial robots that traverse the plant floor and collect Monitoring component 210 can be configured to monitor specified sets of the collected industrial data or robot-collected data for conditions indicative of a performance issue requiring investigation or maintenance. In some embodiments, the sets of industrial data to be monitored, as well as the conditions of this data that indicate a performance concern that requires a maintenance task to be scheduled, can be defined by machine-specific asset models for the industrial equipment being monitored, can be determined or defined by the system 202 based on analysis of the assets' performance over time, or can be manually configured by an administrator of the system 202. The monitoring component 210 can also monitor certain human behaviors, such as those performed by maintenance personnel in connection with performing maintenance tasks associated with respective work orders 222.

Analysis component 212 can be configured to perform analysis on real-time or historical asset performance data, robot-collected data, data obtained from an MES system or a similar high-level enterprise tracking system, contextual information, or other such data to determine when maintenance tasks are to be scheduled, what those maintenance tasks include, and which technicians are to be assigned the tasks. In some embodiments, the analysis component 212 can apply AI or generative AI-assisted analysis to this data in connection with determining when and how maintenance tasks should be scheduled and corresponding work orders generated. Analysis component 212 can also formulate substantially optimized workflows, maintenance schedules, or technician assignments for performing maintenance activities on open work orders 222. The analysis component 212 can also modify these optimized maintenance strategies dynamically based on detected changes in such factors as tool or material availability, technician schedules, machine operating schedules, changes in asset operation or status, or other such factors.

MES interface component 214 can be configured to retrieve, from an MES system or another source of industrial enterprise data, information that can be used by the analysis component 212 to determine when maintenance tasks should be scheduled, which technicians should be assigned the tasks, the nature of the maintenance tasks that should be performed to mitigate a detected risk, optimized workflows or routes for carrying out a scheduled maintenance task, or other such determinations. In some embodiments, the MES interface component 214 can also initiate transmission of notifications to appropriate personnel via the MES in conjunction with generation of work orders 222. Training component 216 can be configured to train one or more trained models with various types of relevant training data. These trained models are used by the system 202 in connection with identifying asset risk conditions that require scheduling of a maintenance action, generating maintenance and performance statistics and insights for customers' industrial assets, and other such functions.

The one or more processors 220 can perform one or more of the functions described herein with reference to the systems and/or methods disclosed. Memory 224 can be a computer-readable storage medium that stores computer-executable instructions and/or information for performing the functions described herein with reference to the systems and/or methods disclosed. Memory 224 can also store the work order data submitted by users as work orders 222.

Figure 3:
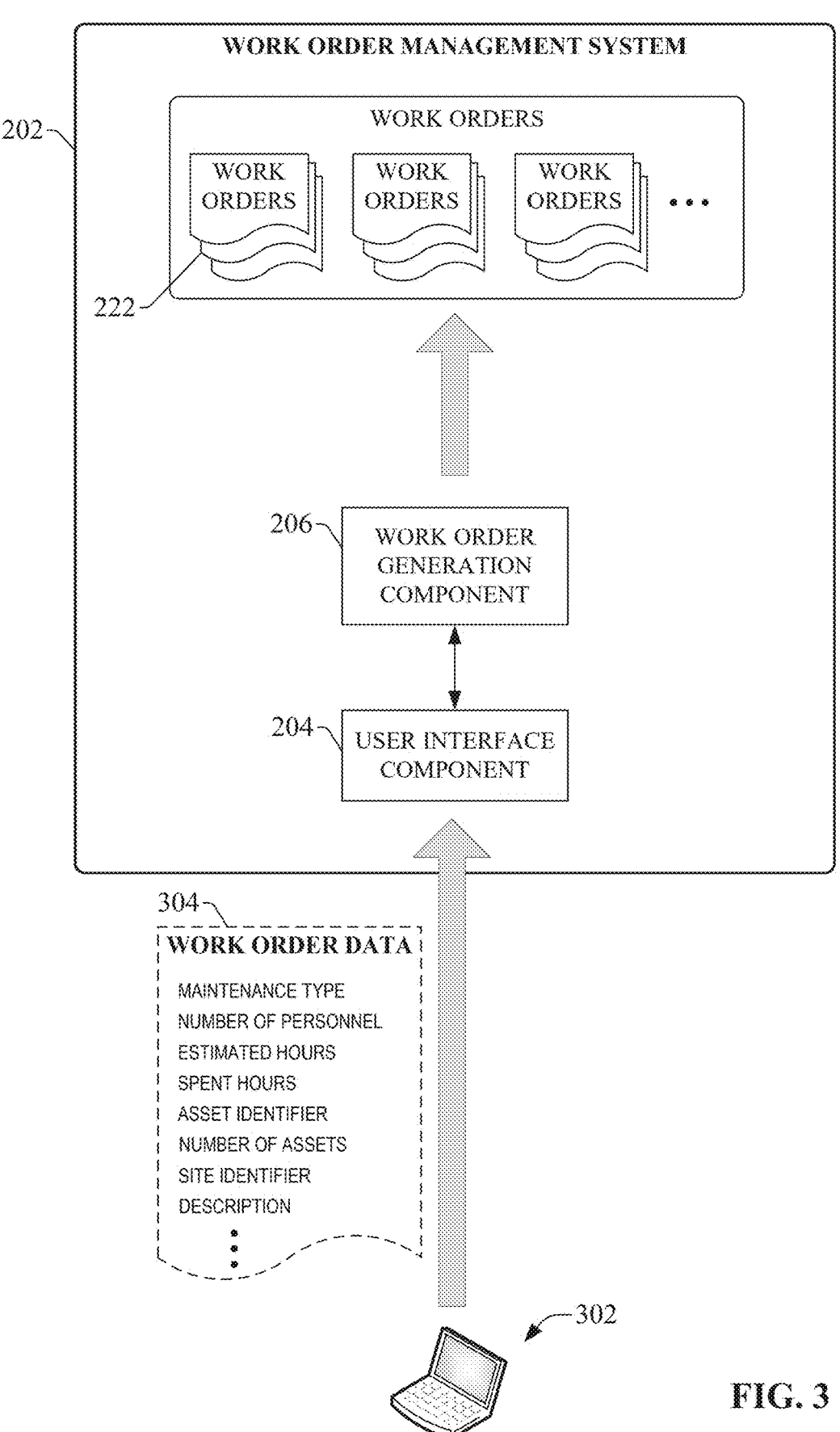
FIG. 3 a diagram illustrating generation of work orders using the work order management system.

FIG. 3 is a diagram illustrating generation of work orders 222 using the work order management system 202. Work order management system 202 can be implemented on any suitable platform that allows the system 202 to be accessed via client devices 308 (e.g., desktop computers, laptop computers, smart phones, tablet computers, wearable computing devices, etc.). For example, system 202 can be executed on a cloud platform as a set of cloud-based services, allowing multiple customer entities across multiple industrial facilities to access the system 202 and initiate work orders 222, view work orders 222, or view work order analysis results. System 202 can also be executed on a public network such as the internet and made accessible to users having suitable authorization credentials. In such embodiments, the system 202 can maintain work orders 222 for different industrial enterprises in a segregated manner, such that employees of a given industrial enterprise can only access work orders and associated analysis results associated with that enterprise.

The user interface component 204 can allow client devices 302 to communicatively interface with the work order management system 202 and submit work order data 304. This work order data 304 can represent either a newly initiated work order for a maintenance task to be performed, or updated information for an open work order 222 that was previously submitted to the system 202. Substantially any work order format can be supported by various embodiments of work order management system 202. In an example scenario, user interface component 204 can generate and deliver, to the client device 302, user interface displays comprising editable data fields representing features of the maintenance job represented by the work order 222. Items of work order data 304 that can be submitted to the system 202 in this manner can include, but are not limited to, a type of maintenance to be performed, a description of the maintenance, the number of personnel required to perform the maintenance, an estimated number of hours to perform the maintenance, an actual number of hours spent on the job, identities and numbers of industrial assets that are subject to the maintenance, identities of industrial sites or facilities in which the maintenance takes place, materials to be used to perform the job, an expected cost to perform the job (e.g., costs of replacement parts), or other such information.

Embodiments of the work order management system 202 are not limited to submission of work order data 304 via such user interfaces. For example, in some embodiments the system 202 can allow the user to submit work order data 304 as natural language text or speech via a chat interface rendered by the system 202. In such embodiments, the work order generation component 206 can translate this natural language input to corresponding work order data 304 which is then used to populate the content of the relevant work order 222.

Based on submitted work order data 304 describing a reactive or proactive maintenance task to be performed, work order generation component 206 can generate a work order 222 containing information about the maintenance task (or set of tasks) to be performed. The system 202 can classify each work order 222 as either an open work order representing a pending maintenance job to be performed on one or more industrial assets (e.g., machines, production lines, industrial devices, etc.) or a closed work order representing a maintenance job that has been completed.

Creation of work orders 222 via manual submission of work order data 304 by plant personnel, as illustrated in FIG. 3, can be suitable for initiating work orders 222 for reactive maintenance tasks, in which the maintenance tasks are intended to address an unexpected asset performance problem or risk condition. Additionally or alternatively, the work order management system 202 can generate some types of work orders 222 automatically according to a defined maintenance schedule. For example, the work order generation component 206 can be configured to automatically generate and schedule work orders 222 for proactive or scheduled maintenance tasks designed to prolong an industrial asset's lifecycle or to proactively prevent asset failures or performance inefficiencies. These proactive maintenance actions can include, for example, oil changes, inspection routines, proactive replacement of parts at regular intervals, or other such scheduled maintenance tasks. The system 202 can generate and schedule these proactive work orders 222 at regular or semi-regular intervals according to a defined frequency at which the maintenance is to be conducted.

Figure 4:
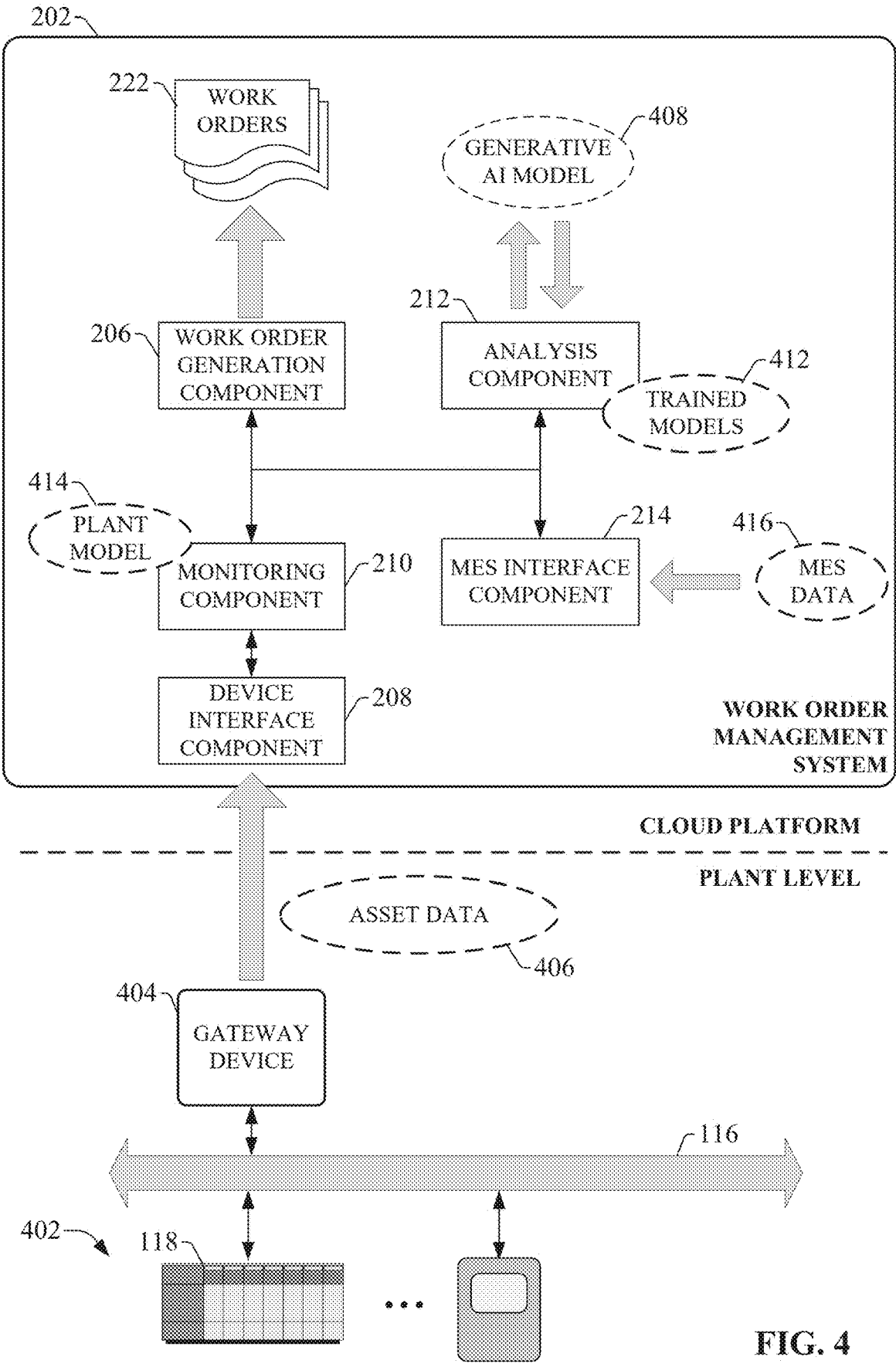
FIG. 4 is a diagram illustrating an example architecture for automatically generating work orders based on analysis of real-time or historical industrial asset performance.

Also, some embodiments of the system 202 can automatically generate reactive work orders 222 in response to real-time detection of an asset performance issue. FIG. 4 is a diagram illustrating an example architecture for automatically generating work orders 222 based on analysis of real-time or historical industrial asset performance. In the example architecture of FIG. 4, a gateway device 404 resides on the same plant network 116 as the industrial devices 402 associated with automation systems on the plant floor. These industrial devices 402 can include, for example, industrial controllers 118, motor drives, HMI terminals, telemetry devices (e.g., flow meters, pressure meters, temperature meters, etc.), sensors of various types (e.g., photo-sensors, proximity sensors, etc.), or other such devices. The automation systems and their associated industrial devices 402, machines, and machine components constitute industrial assets for which reactive or proactive maintenance may be scheduled as needed. During operation of the plant's automation systems, gateway device 404 collects asset data 406 from industrial devices 402. This data can include data values read from data tags, data registers, or automation objects defined on one or more industrial controllers 118; data from analog or digital sensors; data from telemetry devices or meters, or other such data. In general, asset data 406 represents status, operational, or performance data for the industrial assets.

In some embodiments, gateway device 404 can contextualize the collected data 406 prior to delivering the data to the work order management system 202 and deliver the processed data to the system 202 as contextualized data. This contextualization can include time-stamping the data, as well as normalizing or otherwise formatting the collected data for analysis by the work order management system 202. In general, gateway device 404 serves as an edge device that interfaces data from the set of industrial devices 402 to either the work order management system 202 or a separate data storage platform accessible to the work order management system 202.

Although FIG. 4 depicts a scenario in which the system 202 collects and processes asset data 406 from only a single facility owned by a single customer, the work order management system 202 is scalable across multiple industrial facilities. In this regard, the system 202 can serve as a single platform that provides work order generation, maintenance tracking, and maintenance insight services for multiple industrial customers. To achieve this scalability, the system 202 can maintain segregation of respective customer's proprietary data, and can also execute separate instances of the system's services and models 412 for the respective customers.

The work order management system's device interface component 208 can remotely interface with the gateway device 404 to receive the collected asset data 406, and the system's monitoring component 210 can monitor the asset data 406 for conditions indicative of a possible performance issue that necessitates a maintenance action and creation of a corresponding work order 222. In some embodiments, rather than obtaining asset data 406 from the industrial assets (e.g., industrial devices 402 and their associated machines or automation systems) via an integrated device interface component 208, the system's monitoring component 210 may access other sources of real-time or historical asset data 406 generated by the industrial assets within the plant facility, such as a data historian system, a data lake, or other such systems.

Figure 5:
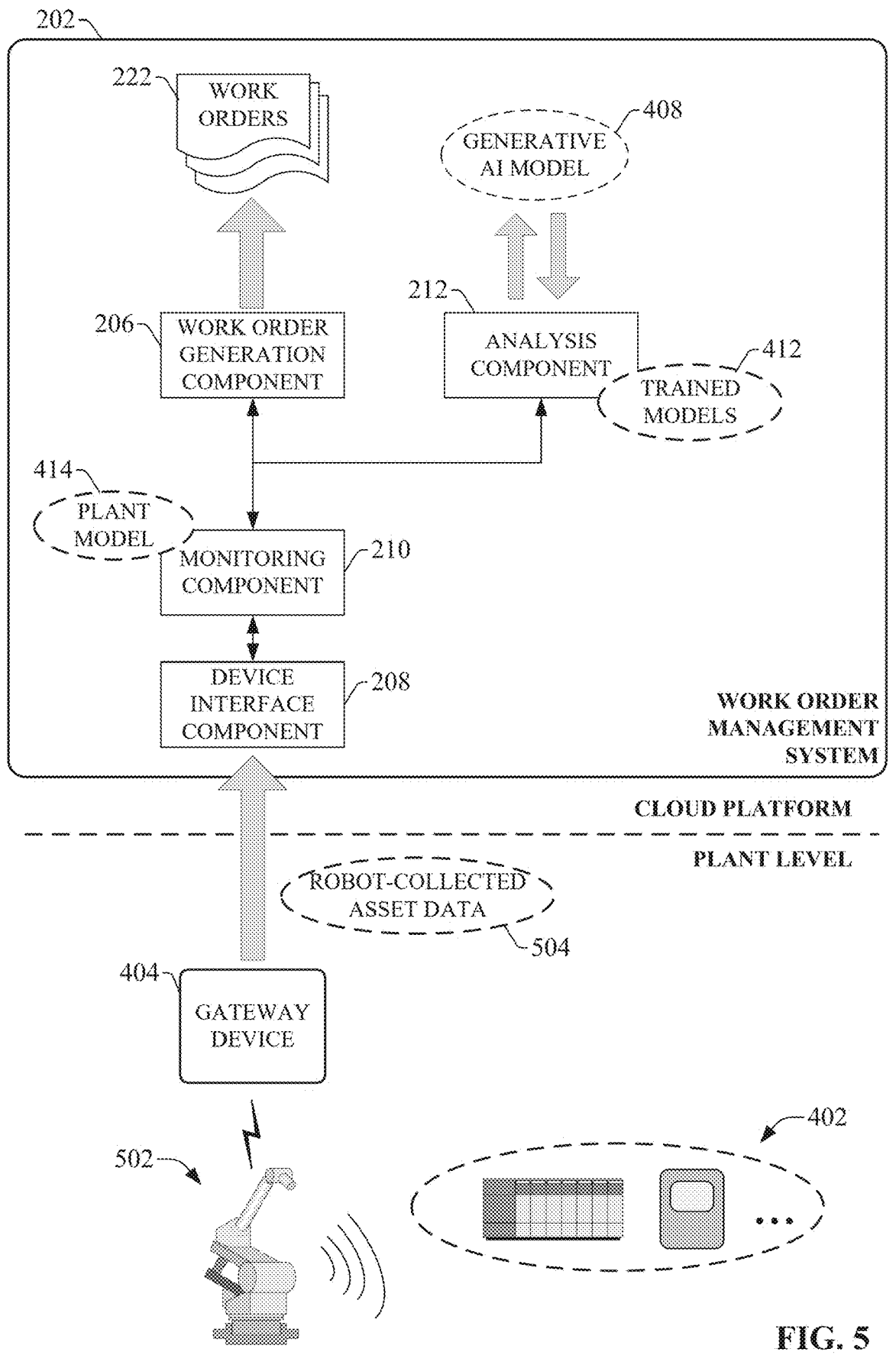
FIG. 5 is a diagram illustrating collection of asset data by an industrial robot and provision of this data to the work order management system.

Some embodiments of the work order management system 202 can also interface with, and receive asset data 406 from, mobile robots that traverse the plant facility. FIG. 5 is a diagram illustrating collection of asset data 504 by an industrial robot 502 and provision of this data 504 to the work order management system 202. Embodiments of the work order management system 202 can interface with substantially any type of industrial robot 502 for the purposes of robot-assisted data collection. Such robots 502 can include, for example, material handling or transportation robots configured to transport parts or materials between locations within the plant. Robots 502 may also include mobile inspection robots configured to traverse an industrial facility and collect various types of information from the facility's industrial assets. These inspection robots 502 can be equipped with sensors of one or more types which are used by the robot 502 to collect operational or status data from the industrial assets. These sensors can include, but are not limited to, infrared sensors, optical sensors such as time-of-flight sensors, two-dimensional or three-dimensional cameras, near-field or wireless communication interfaces configured to read telemetry data stored on the industrial devices 402, or other such data collection equipment. Some robots 502 may be equipped with manipulation or tooling mechanisms, such as robotic arms with gripping mechanisms or tooling attachments, and are programed to perform material handling or tooling tasks. Other types of robots 502 are also within the scope of one or more embodiments of this disclosure.

The work order management system's device interface component 208 can receive robot-collected asset data 504 from one or more robots 502 at the plant facility via any suitable communication architecture. For example, in some architectures the robot 502 may interface with the plant network and send its collected asset data 504 to the work order management system 202 via the gateway device 404. However, other communication architectures or data routes through which the robot 502 provides its collected asset data 504 to the system 202 are also within the scope of one or more embodiments. The work order management system 202 can use the robot-collected asset data 406 in a manner similar to asset data 406 to identify asset performance issues and generate corresponding work orders 222 to address these issues.

For example, inspection robots 502 can traverse inspection routes within the plant facility and measure the states of specific industrial assets or machines; e.g., by performing infrared panel scans, reading data from meters or from the industrial devices 402 themselves, by capturing two-dimensional or three-dimensional image data of the assets, or performing other such information scans. The robot 502 can then feed this collected information to the work order management system 202 as robot-collected asset data 504. Substantially any type of information relating to operational conditions, statuses, or health of industrial assets can be collected by the robots 502 and provided to the system 202 as robot-collected asset data 504. For example, some inspection robots 502 may incorporate vision systems that capture photographic or image data of an industrial asset or machine, or a component thereof, and determine a status of the asset based on analysis of this photographic data (e.g., based on a determination of whether the image data captured for the asset or component deviates from a reference image of the asset or component in a manner indicative of a part defect, an improperly manufactured product, or component wear requiring a replacement of the component). The work order management system's device interface component 208 can collect results of this vision analysis as robot-collected asset data 504, and the analysis component 212 can uses these results in connection with determining whether a maintenance action should be scheduled for the asset and a corresponding work order 222 generated.

In another example, an inspection robot 502 can include wireless data scanning systems that allow the robot 502 to wirelessly interface with sources of status or operational data for an asset (e.g., via a near-field communication link or another wireless communication protocol) and read this data from these data sources for provision to the work order management system as asset data 504. This can include, for example, scanning and collecting metered data from meters or telemetry devices (e.g., temperature meters, flow meters, pressure meters, fill levels, etc.), machine status or operational data from data tags of an industrial controller 118, inspection result data from part inspection stations, or asset status data from other such sources.

Some mobile robots 502 can also be equipped with sensors capable of directly measuring status or performance metrics for industrial assets. Such sensors can include, but are not limited to, presence sensors, time-of-flight cameras or other types of three-dimensional sensors, heat sensors, or other such measurement or inspection sensors. Some robots 502 may also be equipped with motion amplification sensor capable of measuring vibrational information or other subtle motion information from industrial assets or asset components for which vibration is a measure of performance or health. Such robots 502 can collect and amplify motion or vibrational information from these assets and components and provide this information to the work order management system 202 as part of robot-collected asset data 504.

In some scenarios, the system 202 can also use mobile robots 502 to identify new industrial assets within the plant facility and to report the identities of these new assets to the system 202 as part of robot-collected asset data 504. In this regard, robots 502 can be used by the work order management system 202 as discovery agents that assist the system 202 in maintaining an up-to-date inventory of the industrial assets that are in use within the customer's facility. When a new industrial asset is reported to the system 202 as part of robot-collected asset data 504, the system 202 can record such information as the type of the industrial asset (e.g., a type of machine or industrial device), a location of the asset (as reported explicitly by the robot 502 or inferred based on the location of the robot 502 at the time the asset was reported), any relevant mechanical or performance characteristics of the asset observed by the robot 502, or other such information. The monitoring component 210 can record this asset information as part of the plant model 414 (if used) or in another database of customer assets maintained by the system 202. Once a newly discovered asset has been registered in this manner, the system 202 will begin monitoring asset data 406, 504 for the asset and scheduling maintenance tasks for the asset as described above.

When the monitoring component 210, assisted by the analysis component 212, determines that the monitored asset data 406 or the robot-collected asset data 504 satisfies a condition indicative of a current or predicted asset performance issue requiring investigation or correction by maintenance personnel, system's work order generation component 206 can schedule one or more maintenance tasks predicted to correct the performance issue and generate a corresponding work order 222 for the tasks. The condition detected by the monitoring component 210 that triggers creation of a work order 222 can be, for example, a deviation of one or more data tag values that move outside a defined range of normal or expected values, or a deviation of a trend of these data tag values from a learned trend indicative of normal or acceptable asset performance.

In an example scenario, a baking process may require an oven temperature to stay within a defined temperature range. Accordingly, values of a data tag or automation object corresponding to this oven temperature can be collected from the industrial controller 118 that monitors and controls the baking process, and this collected data can be provided to the work order management system 202 as part of the asset data 406 or robot-collected asset data 504. The monitoring component 210 monitors this value to determine when the oven temperature deviates from this range and, in response to detecting such a deviation, instructs work order generation component 206 to generate a new open work order 222 for investigation of the temperature control issue. In some embodiments, machine-specific asset profiles maintained on the work order management system 202 can define which data items or performance parameters of the industrial assets are to be monitored, as well as the conditions of this data that are to trigger creation of work orders 222. In other embodiments, the system 202 can learn to recognize conditions of the asset data indicative of an elevated risk to an asset using machine learning, AI, generative AI, or other analytic techniques.

In some scenarios in which a given machine performance metric is a function of the current states of other performance metrics, the condition that triggers creation of a work order 222 can be based on a holistic set of data value conditions rather than being based on deviation of a single data value. For example, an expected value of a given performance metric for a machine or automation system—e.g., a conveyor speed, an oven temperature, a fill level, etc.—may depend on the current operating mode of the machine, a speed or temperature of another machine component, or other such factors. The value of the performance metric may also be seasonal or time-specific, such that the expected value of the metric depends on a current time of day, a current day of the week, a current month of the year, or another time function. If the health of a machine or automation system is a function of whether concurrent values of multiple data tags are within an expected holistic value space, the monitoring component 210 can be configured to instruct the work order generation component 206 to generate a work order 222 upon determining that these values are in a collective, concurrent state indicating a potential performance problem.

A work order 222 generated by the work order generation component 206 can contain information about the maintenance task to be performed, including but not limited to an identity of the industrial asset or machine for which maintenance is required, an aspect of the industrial asset that requires attention, a type of the maintenance to be performed, an estimated number of hours to be spent on the maintenance task, an estimated number of personnel to be assigned to the task, a description of the task, or other such information. The work order 222 is initially scheduled in the system 202 as an open work order 222 (that is, the system 202 stores the work order 222 as work order data in memory 224 and assigns an "Open" status to the work order 222) and remains open until completion of its associated maintenance tasks, at which time the system 202 assigns a "Closed" status to the work order 222.

Figure 6:
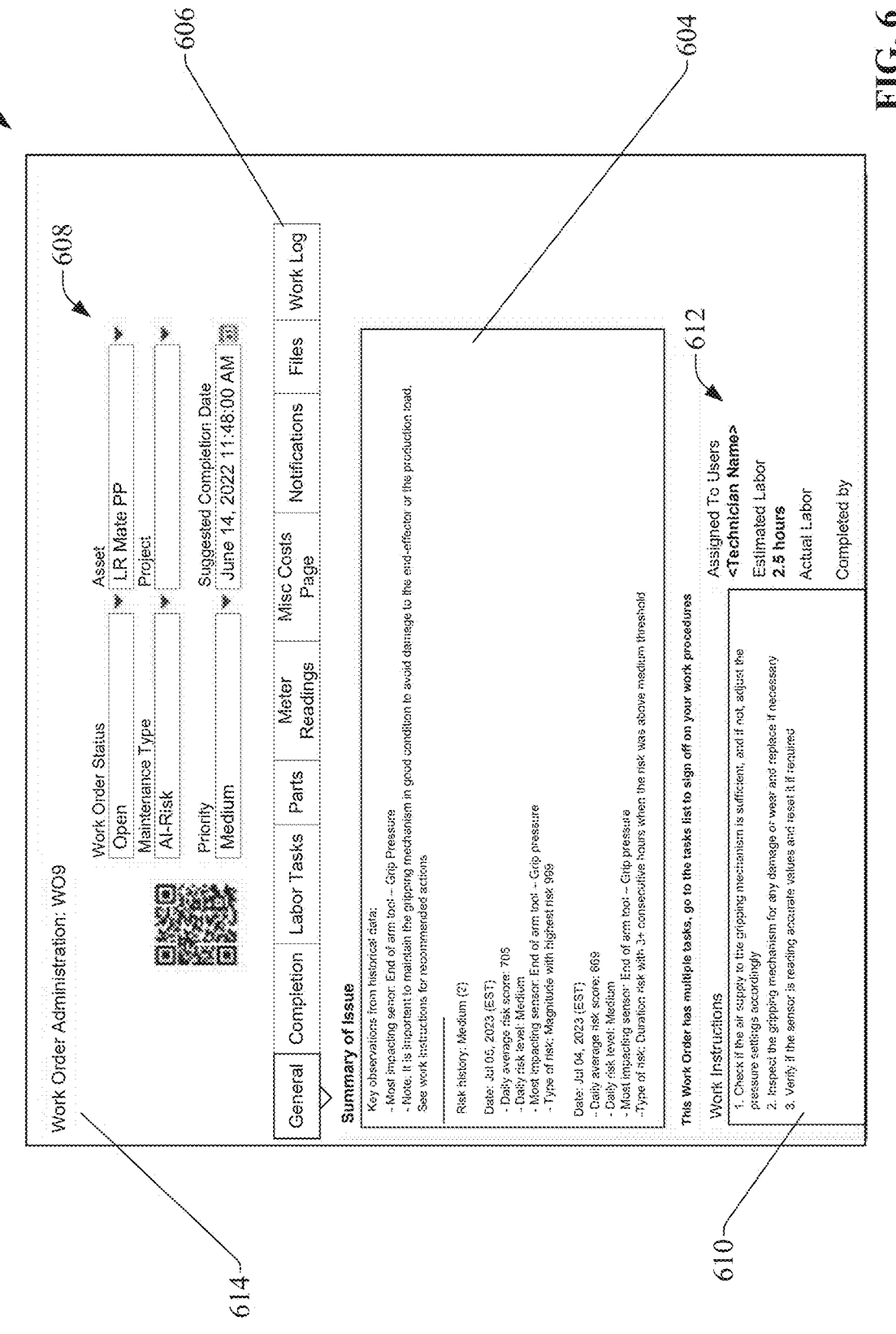
FIG. 6 is an example work order display that can be rendered on a client device by the user interface component.

Authorized users can browse and view both open and closed work orders 222 via user interface component 204. FIG. 6 is an example work order display 602 that can be rendered on a client device by the user interface component 204. When a user selects a work order 222 via interaction with the work order system's primary user interface, the user interface component 204 can render a work order display 602 and populate the display 602 with information about the work order. In the example depicted in FIG. 6, the work order display 602 comprises a work order identifier 614 that uniquely identifies the selected work order 222, a section 608 that displays general information about the work order 222 (e.g. the open or closed status, a type of maintenance to be performed, a priority, an identity of the asset on which the maintenance task is to be performed, a suggested completion date for the maintenance, a name of a project with which the maintenance task is associated, etc.), and a navigation bar

606 comprising selectable controls corresponding to respective different categories of additional information that can be viewed.

In the illustrated example, the user has selected the General category from the navigation bar 606, which causes the work order display 602 to render a Summary box 604 containing summary information about the maintenance task, including a description of the asset performance issue or risk to be mitigated by the maintenance task, relevant key observations about the asset, risk information for the asset (e.g., a daily average risk score or a risk level), or other such information. The display 602 also renders an Instructions box 610 that displays instructions for performing the maintenance task, and a section 612 that displays miscellaneous additional information (e.g., identities of the technicians assigned to perform the maintenance task, an estimated number of hours for performing the task, the actual number of hours that were required to perform the tasks, or other such information.

Figure 7:
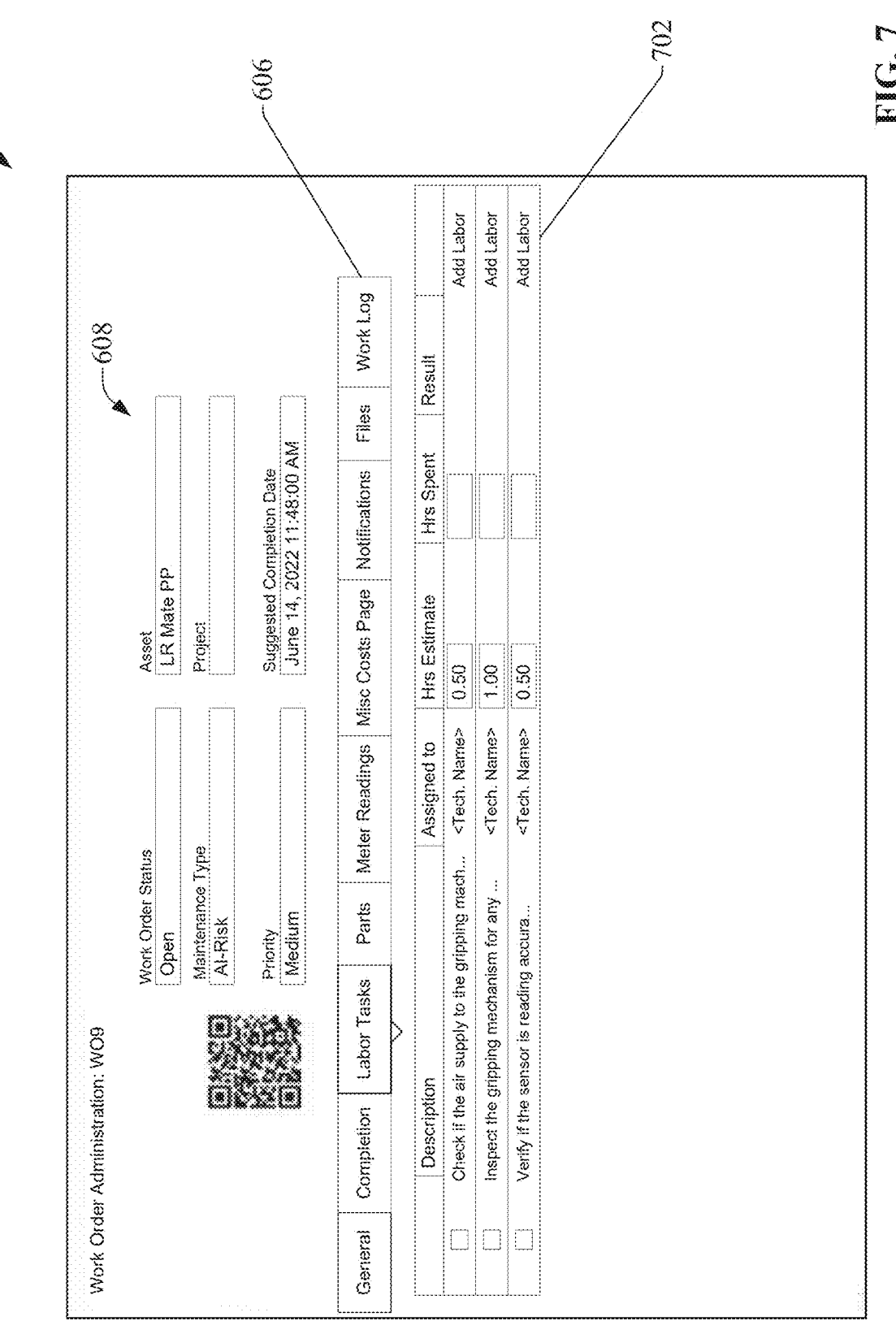
FIG. 7 is another example view of the work order display that renders the individual maintenance tasks defined by a work order as a formatted list.

FIG. 7 is another example view of the work order display 602 in which the user has selected the Labor Tasks category from the navigation bar 606, which causes the display 602 to render the individual maintenance tasks defined by the work order 222 as a formatted list 702. Each entry of the list 702 represents a task to be performed, and includes a description of the task, an identity of a maintenance technician to whom the task is assigned, fields for the estimated and actual number of hours spent on the task, a result of the task, and an interactive checkbox control for indicating that the task has been completed.

Some embodiments of the work order tracking system 202 can reference information about the industrial assets in use within a plant facility, and the functional or geographic relationships between these assets, in connection with determining when to schedule maintenance activities or generating maintenance planning and tracking data. In some embodiments, this information can be maintained in a plant model 414 that defines industrial machines, systems, or assets within the plant facility as well as the functional or geographic relationships between those assets. For example, the plant model 414 may define the relative locations of respective machines or automation systems within the plant, functional relationships between the machines (e.g., interdependencies between the machines or systems, such as indications of which automation systems are responsible for providing material or parts to other downstream systems), or other such asset information. In some embodiments, the plant model 414 can comprise a set of asset profiles representing respective industrial assets that are in service within the customer's facility, as well as defined functional or hierarchical relationships between these asset profiles representing the functional relationships between the corresponding physical assets (e.g., indications of which assets are components or sub-assets of other assets, indications of which assets provide parts or material to other assets within a production line, etc.).

To facilitate intelligent automated generation of work orders 222, the monitoring component 210 can be assisted by an analysis component 212 in some embodiments. The analysis component 212 that can apply one or more types of analysis (e.g., artificial intelligence (AI), generative AI analysis or generative AI-assisted analysis, machine learning, etc.) to real-time or historical asset data 406, robot-collected asset data 504, MES data 416 from the plant facility's MES system or another high-level plant managements system, and other contextual data in connection with determining when to schedule maintenance tasks, what these maintenance tasks entail, and which technicians are to be assigned the tasks. For example, in some embodiments, the analysis component 212 can leverage generative AI to automatically generate work orders 222 or otherwise schedule maintenance tasks based on predicted or detected asset risks. In such embodiments, the analysis component 212 can be configured with prompt engineering functionality using associated trained models 412 trained with various types of training data, and can use these prompt engineering features to interface with a generative AI model 408 (e.g., a large language model (LLM) or another type of model) and associated neural networks.

Figure 8:
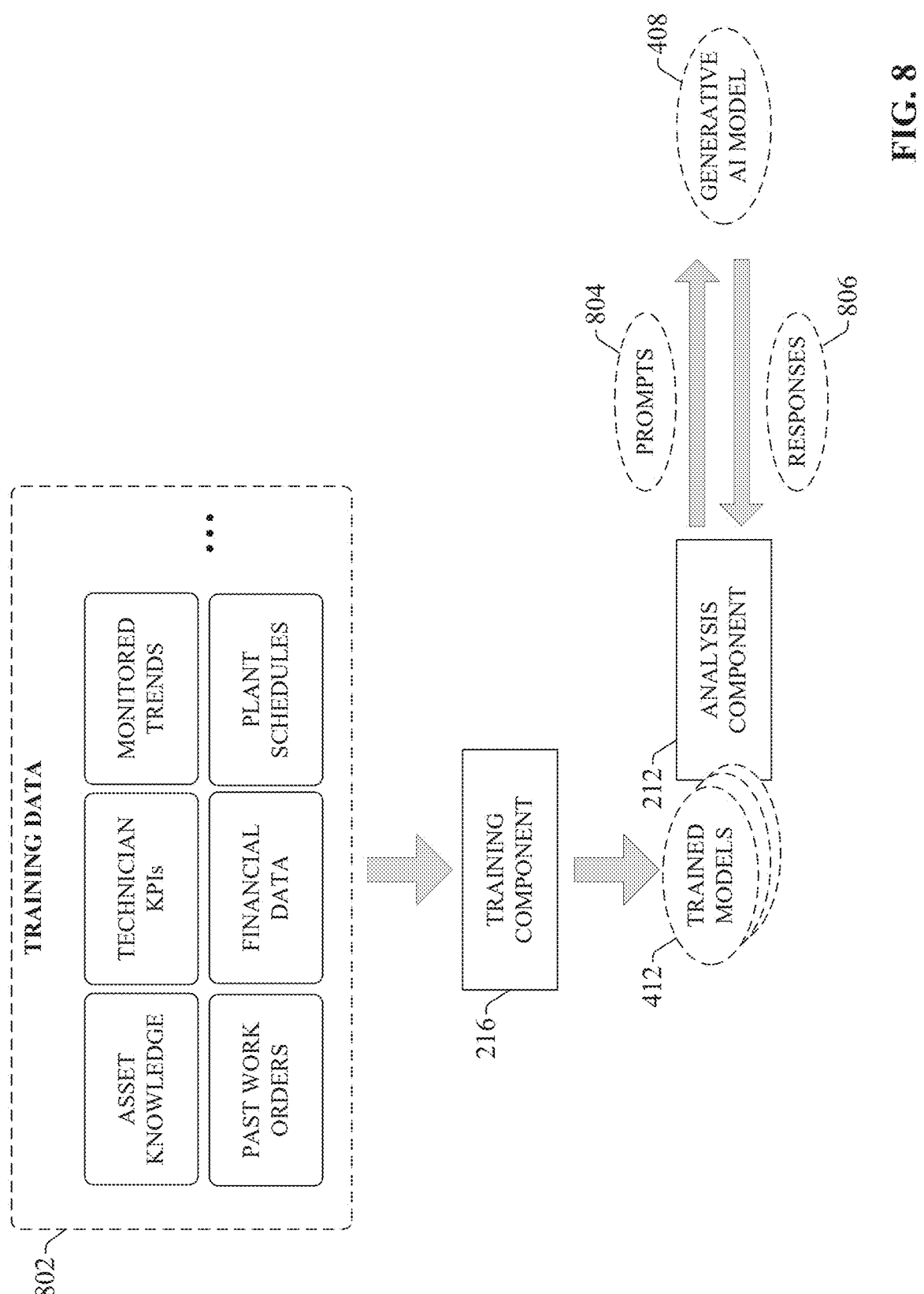
FIG. 8 is a diagram illustrating training of models used by some embodiments of the work order management system.

FIG. 8 is a diagram illustrating training of the models 412 used by some embodiments of the analysis component 212. The system's training component 216 can train models 412 using training data 802 relevant to identification or prediction of risks to the plant facility's industrial assets, scheduling of suitable maintenance tasks for mitigating the risks, and assignment of those maintenance tasks to suitable technicians. Such training data 802 can include, but is not limited to, knowledge or technical specifications of industrial assets, machines, and devices that are in service within the industrial facility; information from past or closed work orders 222; monitored trends in asset operation (e.g., histories and frequencies of asset failure); information about technicians employed by the plant facility (e.g., employee identities, skill sets, work histories relative to specific assets or types of maintenance tasks, work schedules etc.); financial data for the plant facility; or other such data 802.

The monitoring component 210 and analysis component 212 can detect a current asset risk condition (or predict a future asset risk condition) that requires scheduling of a maintenance task and generation of a corresponding work order 222 based on analysis of real-time or historical asset data 406 and robot-collected asset data 504, as well as content of the trained models 412. In some scenarios, this analysis can be performed without accessing the generative AI model 408. However, the analysis component 212 can also, as needed, interact with the generative AI model 408 as part of the risk detection analysis, or as part of the work order generation process. For example, as the work order management system 202 is monitoring asset data 406 and/or robot-collected asset data 504 for risk conditions, the analysis component 212 can determine whether a given subset of the asset data 406 generated by an industrial asset or related groups of assets (or asset data 504 collected for the asset by an industrial robot 502) is indicative of a risk condition based on knowledge of the relevant industrial assets (e.g., values of performance indicators known or inferred to correlate with a risk condition for those specific assets, the nature of the risk condition indicated by anomalous values of those performance indicators, lifecycle information for the assets, etc.), and this asset knowledge can be obtained from technical asset information encoded in the trained models 412 as part of training data 502 or can be prompted from the generative AI model 408 using suitable prompts 804 generated by the analysis component 212.

Similarly, when an asset risk is detected, the analysis component 212 can determine a suitable set of maintenance tasks for mitigating the detected or predicted risk based on the training data 802 encoded in the models 412, as well as responses 806 prompted from the generative AI model 408. Responses 806 prompted from the generative AI model 408 can also be used by the work order generation component 206 to generate natural language content to be included in the corresponding work order 222 (e.g., natural language descriptions of the asset risk, natural language descriptions of the maintenance tasks rendered, etc.).

In the scenarios described above, the analysis component 212 may prompt the generative AI model 408 for supplemental information in response to determining that additional information from the generative AI model 408 would yield an analytic result having a higher probable level of accuracy relative to relying solely on the asset data 406, 504 and trained models 412 alone. To support generative AI-assisted generation and scheduling of work orders 222, the analysis component 212 can be configured with custom prompt engineering capabilities designed to prompt the generative AI model 408 for supplemental information that can be used by the work order management system 202 to recognize industrial asset risk conditions, infer suitable corrective maintenance tasks for mitigating asset-specific risks, and generate content of a work order 222 for the maintenance tasks.

During the asset monitoring process, the analysis component 212 can formulate and submits prompts 804 to the generative AI model 408 designed to obtain responses 806 that can assist with monitoring the performance of industrial assets for risk conditions, formulating maintenance strategies for mitigating the risk conditions, or generating content of a work order 222. The analysis component 212 can generate these prompts 804 based on a current operating context of one or more industrial assets being monitored (as determined from real-time or historical asset data 406, 504) as well as the training data 802 encoded in the trained models 412. The analysis component 212 can reference the trained models 412 or associated training data 802 as needed in connection with creating prompts 804 designed to obtain responses 806 from the generative AI model 408 that assist the analysis component 212 in recognizing a current or predicted risk to an industrial asset, formulating a maintenance intervention for mitigating the risk, or generating content of a work order 222 for scheduling the maintenance intervention (e.g., natural language summaries of the identified asset risk, as well as descriptions of the maintenance tasks for mitigating the risk). The analysis component 212 can generate the prompt 804 to include any relevant information that can assist the generative AI model 408 in converging on a useful responses 806 that can be used to better understand a current context of the industrial assets, including but not limited to a selected subset of the asset data 406, 504 itself, the type of industrial asset of interest (e.g., a type of machine or industrial device), an indication of the type of industrial process or application being carried out by the industrial asset of interest (e.g., a specific type of batch processing, a specific automotive manufacturing function, a sheet metal stamping application, etc.), any selected subsets of the training data 802 or MES data 416, or other such data.

The techniques described above for generating or initiating a work order 222 within the work order management system 202 are only intended to be exemplary, and it is to be appreciated that substantially any technique for initiating a work order 222 using work order management system 202 are within the scope of one or more embodiments of this disclosure.

In some embodiments, the trained models 412 can include one or more predictive models that are trained by the training component 216 to forecast or predict future performance issues or failure risks for the industrial assets. The training component 216 can automatically train these predictive models using machine learning algorithms applied to asset data 406, 504 collected from the assets over time, from which the predictive models can learn performance trends for individual industrial assets and use these trends to predict future performance issues. The work order management system 202 can use these predictive models to identify potential future asset failures or performance degradations, and to automatically generate work orders 222 for maintenance activities designed to mitigate these issues in response to these predictions.

Figure 9:
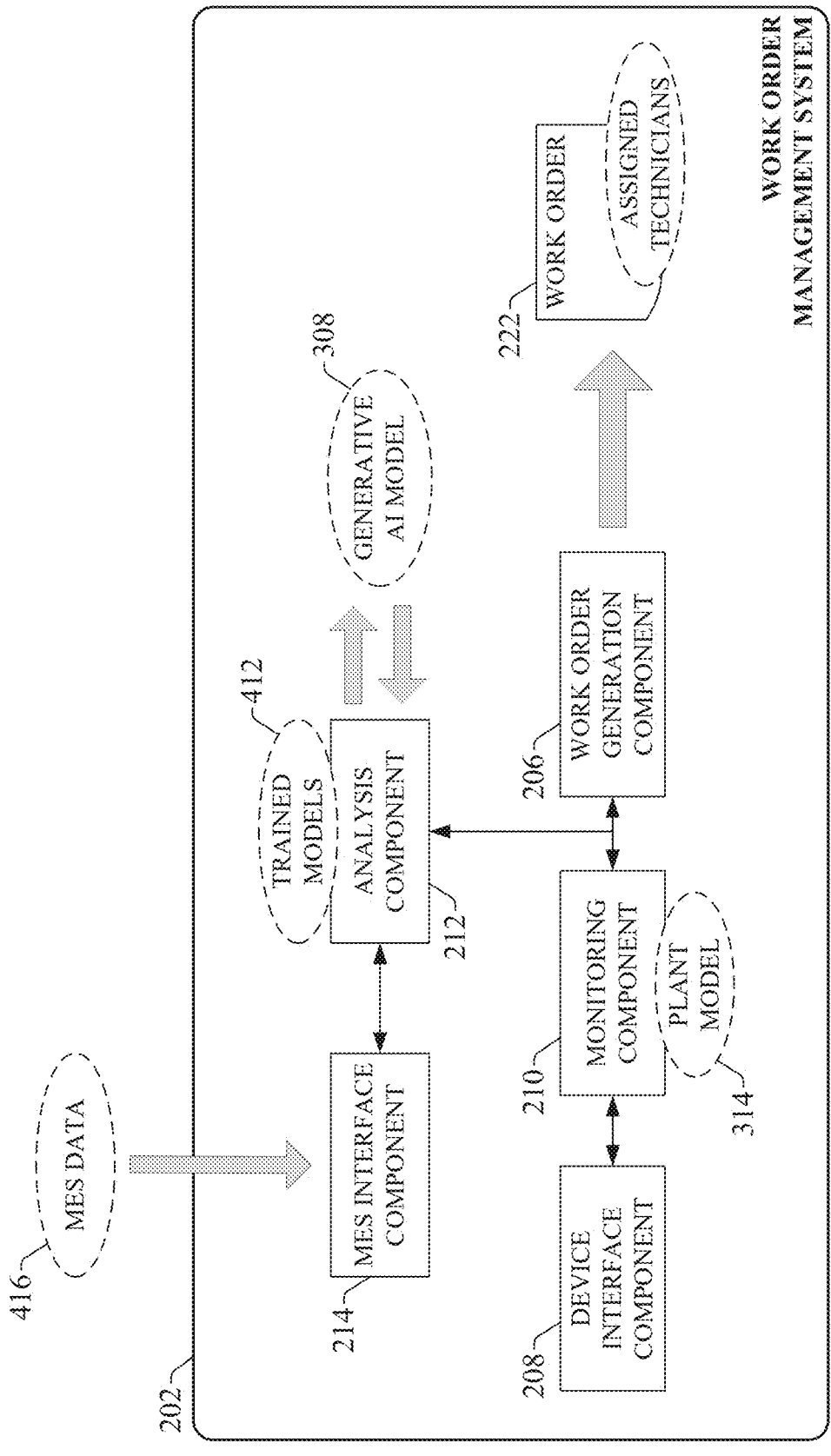
FIG. 9 is a diagram illustrating generation and assignment of a work order to one or more selected technicians by the work order management system.

When generating a work order 222 for a maintenance task (e.g., based on the performance monitoring techniques described above), the analysis component 212 can also select one or more technicians or maintenance personnel to whom the work order 222 will be assigned, and the work order generation component 206 can generate the work order 222 to include information specifying the selected technicians and update corresponding employee work schedules within the system 202. FIG. 9 is a diagram illustrating generation and assignment of a work order 222 to one or more selected technicians by the work order management system 202. When assigning a work order 222 to one or more technicians, the analysis component 212 can consider the relative competencies and schedules of the technicians employed by the plant facility. In an example scenario, the analysis component 212 can initially estimate a number of technicians required to perform the maintenance tasks defined by the work order 222, or a number of technicians that satisfies an overall maintenance efficiency criterion. The analysis component 212 can then select specific technicians from among the technicians registered as employees (or contractors) of the plant facility to fill the selected number of personnel, and assign the work order 222 to those technicians. The analysis component 212 can assign maintenance tasks defined in the work order 222 to one or more selected technicians based on a determination that the technicians' skill sets or past experiences are suitable for carrying out the defined maintenance tasks.

To assist with this work order assignment analysis, the analysis component 212 can reference relevant subsets of the plant facility's MES data 416 (or other sources of technician information) that identify the technicians associated with the plant facility as well as the respective technicians' work schedules and skill sets. For example, if the MES system maintains information regarding the roles and availability schedules of plant personnel, the MES interface component 214 can retrieve this information as MES data 416, and the analysis component 212 can analyze this data 416 to determine identities of technicians who are qualified to attend to the maintenance task and whose schedules indicate that the technicians are available to work on the task within the time frame defined by the work order 222. In general, the analysis component 212 can match the work order's maintenance tasks to a selected subset of technicians based on best fit criteria that considers the technicians' relative levels of experience or skill in performing the maintenance tasks, relevant skill sets, work schedules, availability bandwidths, or other factors (some or all of which can be obtained from the plant's MES system as MES data 416).

Collectively, a current set of active work orders 222 at any given time represents a holistic maintenance strategy for performing scheduled and reactive maintenance tasks that are to be performed on a customer's industrial assets. This strategy is reflected in the particular assets on which maintenance is to be performed, relative priorities assigned to the work orders 222, scheduled times at which the work orders 222 are to be performed or an order in which the work orders 222 are to be performed, resources to be allocated for execution of the respective work orders 222 (e.g., technician assignments, tool or material allocations, etc.), or other such properties assigned to the work orders 222. Embodiments of the work order management system 202 can formulate an aggregate or holistic maintenance strategy for a given set of open work orders 222 or maintenance tasks based on one or more defined optimization criteria, such that the strategy optimizes one or more maintenance metrics or satisfies the optimization criteria. The system 202 can also dynamically modify or revise maintenance schedules and associated work order priorities in response to contextual changes within the plant in order to maintain optimization of the overall maintenance strategy. This can include re-prioritizing work orders 222 and their associated maintenance tasks, if necessary, based on results of operators' daily machine checks or technician's daily asset inspections, which may necessitate a re-evaluation of relative asset risk and corresponding re-prioritization of scheduled maintenance tasks.

Figure 10:
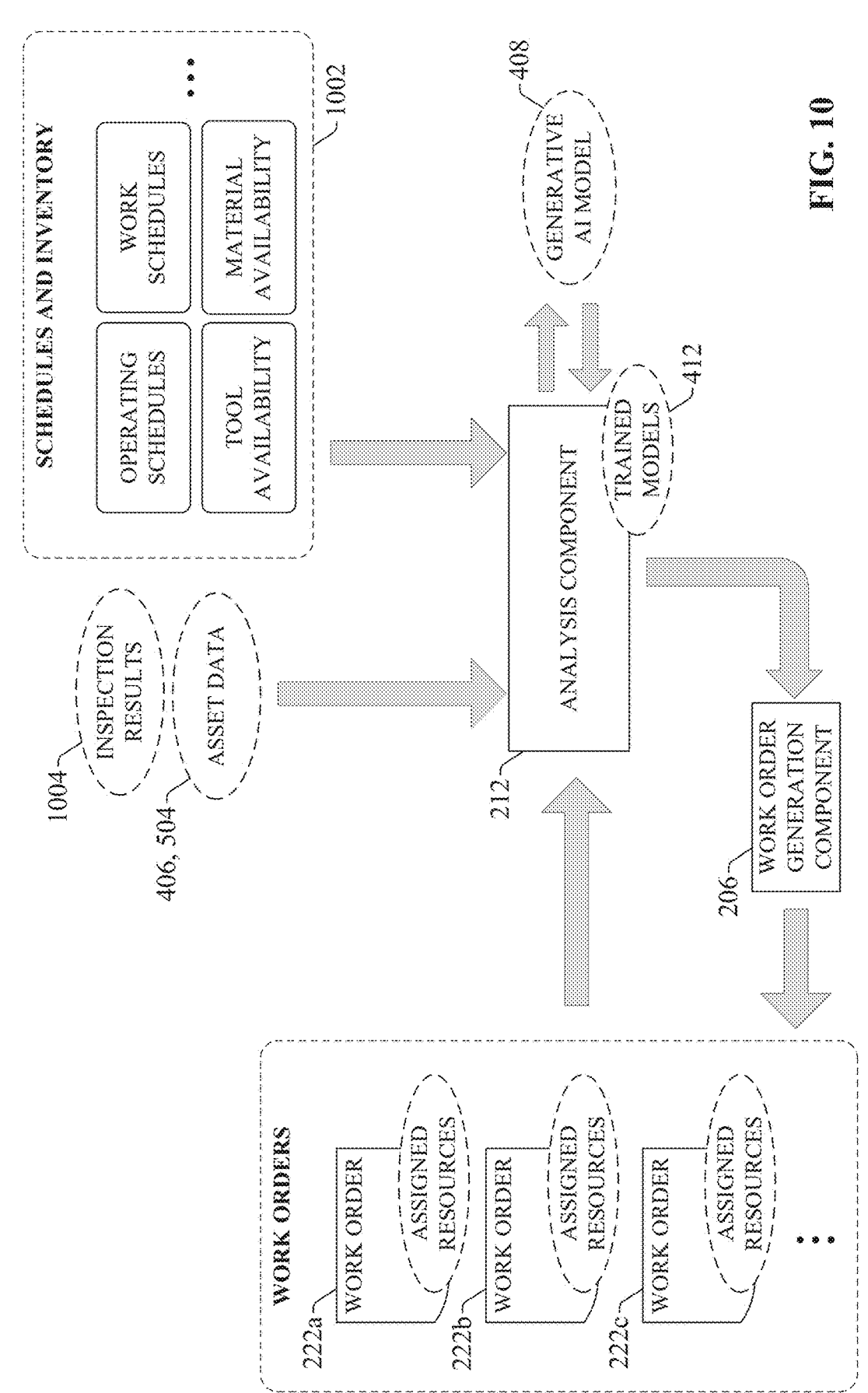
FIG. 10 is a diagram illustrating dynamic context-based adjustment of work orders by the work order management system.

FIG. 10 is a diagram illustrating dynamic context-based adjustment of work orders 222 by the system according to one or more embodiments. In general, the analysis component 212 can determine work order execution strategies that at least one of maximize overall maintenance efficiency, minimize the total time to execute the open work orders 222, minimize labor or material costs associated with execution of the work orders 222, minimize the number of technicians or autonomous vehicles required to complete the work orders 222, minimize the number of steps taken by the technicians to complete the work orders 222, or optimize other such factors selected or defined by the customer. The analysis component 212 can formulate these strategies based on aggregate analysis of the work orders 222 themselves (including the identities of the assets to which the respective work orders 222 are directed, the type of maintenance to be performed, etc.) as well as other plant-specific information such as the locations of the industrial assets within the plant facility (which can be obtained from the plant model 414 or from another source of asset location information), technician schedule and skill set information (which can be obtained by the MES interface component 214 as part of MES data 416, or from another source of technician information), the numbers and capabilities of autonomous vehicles available to assist with execution of the work orders 222, plant operating schedules or operating schedules for individual lines or assets, availability of parts or materials required for the respective maintenance tasks, or other such data. In some embodiments, the analysis component 212 can also reference information contained in trained models 412 (or the training data 802 itself) in connection with formulating optimized strategies for executing open work orders 222. The work order generation component 206 can translate these strategies into suitable work orders 222, setting the priorities, orders of execution, execution schedules, labor tasks, parts and materials, or other properties of the work orders 222 in a manner that aligns with the overall maintenance strategy formulated by the analysis component 212.

Additionally, if the system 202 determines that changes in contextual conditions within the plant necessitate modifying one or more open work orders 222 to re-optimize the overall maintenance strategy in order to satisfy the defined optimization criteria (e.g., maximizing overall maintenance efficiency, minimizing total maintenance time, minimizing labor or material costs, etc.), the analysis component 212 can determine the necessary work order modifications and instruct the work order generation component 206 to modify the appropriate work orders 222 and maintenance schedules accordingly.

Contextual changes that can cause the system 202 to initiate an adjustment to a work order 222 or maintenance schedule can include, for example, a change in operation or status of one or more industrial assets or machines, as determined based on analysis of real-time asset data 406 or robot-collected asset data 504. Operational changes that may necessitate modifying or adjusting properties of an existing open work order 222 can include, for example, discovery of a new failure or performance issue on an industrial asset that may have a higher maintenance priority than one or more currently open work orders 222 or that may require the use of technicians or tools that had been previously allocated to another lower priority work order 222. In such cases, the analysis component 212 may, in addition to creating and scheduling a new work order 222 for the newly discovered issue, modify properties of one or more other open work orders 222 in order to satisfy the defined optimization criteria given the scheduling of the new work order 222. These work order modifications can include, for example, changing the relative priorities of the work orders 222; changing the suggested completion dates of the respective work orders 222; redistributing the allocations of technicians, tools, parts, or materials among the work orders 222; or other such modifications.

In another example, the asset data 406, 504 may indicate that an industrial asset or machine has altered its current operating mode, production recipe, or another operating condition in a manner that necessitates an update to the overall maintenance strategy and a commensurate modification of currently open work orders 222. Such changes in machine operation may necessitate a reprioritization of maintenance tasks due to increased or decreased importance of the asset's new operating mode. Accordingly, the analysis component 212 can revise the optimized maintenance strategy in view of the altered asset operation and instruct the work order generation component 206 to implement the modifications on the relevant work orders 222.

In some embodiments, the work order management system 202 can also modify relative priorities of open work orders 222 based on results of daily inspections performed by machine operators or technicians on industrial assets for which they are responsible. For example, machine operators who are assigned to operate a given machine of a production line may be required to perform various operator inspection tasks on the machine at the beginning of their shift prior to beginning operation, and submit results 1004 of these inspections to the work order management system 202 (e.g., via a user interface rendered on the operators' client devices by the user interface component 204). These inspections may comprise visual or tactile inspections of machine components to verify mechanical integrity, testing the operations of manual or semi-automatic machine controls, verifications that pathways for material or parts processed by the machine are clear of obstructions, machine safety checks, verification that levels of oil or other fluids are not low, or other such inspections. In some scenarios, these inspections may be formally scheduled in the work order management system 202 as a daily work order 222, and the system 202 can record the submitted inspection results 1004 as part of each daily work order 222 before closing the work order.

Based on submitted results 1004 of these inspections, the analysis component 212 can determine whether one or more open work orders 222 that are currently scheduled in the system 202 should be reprioritized or otherwise modified based on the results 1004 of that day's inspections. For example, inspection results 1004 for a given machine may indicate a potential risk that, if left unmitigated, may cause the machine to experience a performance issue or downtime during the work shift. Based on this determination, the analysis component 212 can initiate scheduling of a new work order 222 to address the risk as discussed above, as well as assess the priority of the new work order 222 relative to the other open work orders 222 in the system. Based on results of this assessment, the analysis component 212 can modify the priorities of the open work orders 222 as needed and update the maintenance schedules accordingly.

In addition to dynamically adjusting work orders 222 and maintenance schedules based on changes in operating conditions of the industrial assets or results of daily inspections, the system 202 can also adjust work orders 222 based on schedule and inventory data 1002 that records the customer's current plant and machine operating schedules, technician or operator work schedules, inventory levels of parts and materials, availability of tools or equipment used for maintenance tasks, or other such information. This schedule and inventory data 1002 can be provided to the system 202 from any of the customer's sources of schedule and inventory information, including but not limited to a local or cloud-based inventory tracking system that records current inventory levels of parts or materials, employee scheduling systems that record the current and future work schedules for respective maintenance technicians, or other such sources. At least some of the schedule and inventory data 1002 may be maintained on the customer's MES system. In such cases, these portions of schedule and inventory data 1002 can be provided to the work order management system 202 as MES data 416.

The system's analysis component 212 can monitor schedule and inventory data 1002 to detect changes to any of these work schedules, operating schedules, or availabilities, and if any of these changes are determined to merit a modification of one or more work orders 222 in order to satisfy the defined optimization criterion, the analysis component 212 can formulate the necessary modifications and instruct the work order generation component 206 to modify the open work orders 222 accordingly.

For example, if a change in a technicians' work schedules either removes the availability of a technician who has been scheduled to carry out a work order 222 or makes available a technician whose schedule had previously indicated that the technician was unavailable for work, the analysis component 212 can determine whether the current assignments of technicians to the respective work orders 222 can be modified, given the unexpected availability or unavailability of the technician, in a manner that improves the maintenance optimization metrics. If so, the analysis component 212 can determine an optimized reassignment of technicians and instruct the work order generation component 206 to implement the appropriate modifications to the work orders 222 and corresponding maintenance schedules. This may involve, for example, assigning a newly available technician to a work order 222, reassigning a technician to a different work order 222 in place of a newly unavailable technician, altering the current assignment of technicians to achieve a better matching of work order requirements with technician skill sets, or implementing other such work order modifications.

In another example, the plant facility may modify its current operating schedule for an industrial machine, or for the plant as a whole. The analysis component 212 can identify this modification (based on changes to the schedule and inventory data 1002) and, if the schedule modification yields a conflict with the scheduling of any open work orders 222, the analysis component 212 can determine a modified work order schedule 222 that does not conflict with the new operating schedule, and that also substantially optimizes any defined maintenance optimization criteria, and instruct the work order generation component 206 to update the work orders 222 and their corresponding maintenance schedules accordingly.

The work order management system 202 can also respond to changes in tool and material availabilities, as reported by the schedule and inventory data 1002. For example, some customers may maintain an availability schedule for some of their maintenance tools and equipment, which records both a current availability of those tools as well as scheduled future availabilities of the tools as determined based on technicians' requests for future use of the tools on specified days and times. In response to identifying a change in current or future availability of tools or equipment required to carry out maintenance tasks prescribed by one or more of the work orders—e.g., an increase or decrease in the number of tools or units of equipment—the analysis component 212 can determine whether a current assignment of tools or equipment to the respective work orders 222 should be modified in view of the modified tool availability in order to re-optimize the overall maintenance optimization metrics. If so, the analysis component 212 can formulate an updated reassignment of tools and instruct the work order generation component 206 to modify the work orders 222 as needed to reflect the tool reassignment. Detected changes to current or future availability of materials required to perform some of the scheduled maintenance tasks, such as oil or cleaning agents, can also cause the analysis component 212 to initiate a re-optimization and corresponding modifications to the work orders 222.

For customers that employ autonomous vehicles or robots 502 to assist with maintenance tasks (e.g., for part retrieval, tooling assistance, part or material handling or manipulation, etc.), the analysis component 212 can also monitor the availability schedules of these autonomous vehicles and make appropriate changes to the maintenance strategy in response to detecting an update to these schedules.

In some scenarios, changes to technician, tool, or material availability may also necessitate a change in the scheduling of one or more of the work orders in order to satisfy the maintenance optimization criteria. For example, in response to determining that a tool or material required to perform a given work order 222 will not be available at the work order's currently scheduled time, the analysis component 212 can determine a rescheduling of the work orders 222 as a group that ensures that the work order 222 is scheduled for a time at which the required tool or material is available and that also maintains satisfaction of the defined maintenance optimization criteria. Similarly, if a previously unavailable tool or material is determined to be unexpectedly available at a certain day and time, the analysis component 212 can determine whether a new scheduling strategy for the work orders 222, taking into account the newly available tool or material, will better satisfy the maintenance optimization criteria. If so, the analysis component 212 can formulate a new scheduling strategy for the work orders 222 that both takes advantage of the newly available tool or material and that satisfies the defined maintenance optimization criteria. Similar rescheduling actions can be initiated in response to, and based upon, changes in technician availabilities.

As part of the process of dynamically updating and optimizing work orders 222 in response to changes in plant operation, schedules, and inventory, the analysis component 212 can leverage the content of trained models 412, as well as prompted responses 806 from the generative AI model 408, to assist in formulating suitable schedules, technician assignments, and resource allocations for the work orders

222 that are determined to satisfy the defined maintenance optimization criteria given the contextual changes (see FIG. 8). For example, if a change to a current operating context or availability schedule necessitates a reformulation of the overall maintenance strategy for executing the open work orders 222, the analysis component 212 can formulate and submit prompts 804 to the generative AI model 408 designed to obtain responses 806 that can assist with determining a maintenance strategy that satisfies the required optimization metrics or criteria given the updated contextual conditions.

Embodiments of the work order management system 202 described herein can intelligently and dynamically optimize an industrial customer's overall maintenance strategies and corresponding work order 222 content and schedules, automatically taking into consideration changes in asset operating context, operating or work schedules, and scheduled availabilities of tools, equipment, and materials. The system can leverage generative AI as needed to assist in formulation of maintenance strategies that satisfy maintenance optimization criteria of interest to the customer.

Figure 11A:
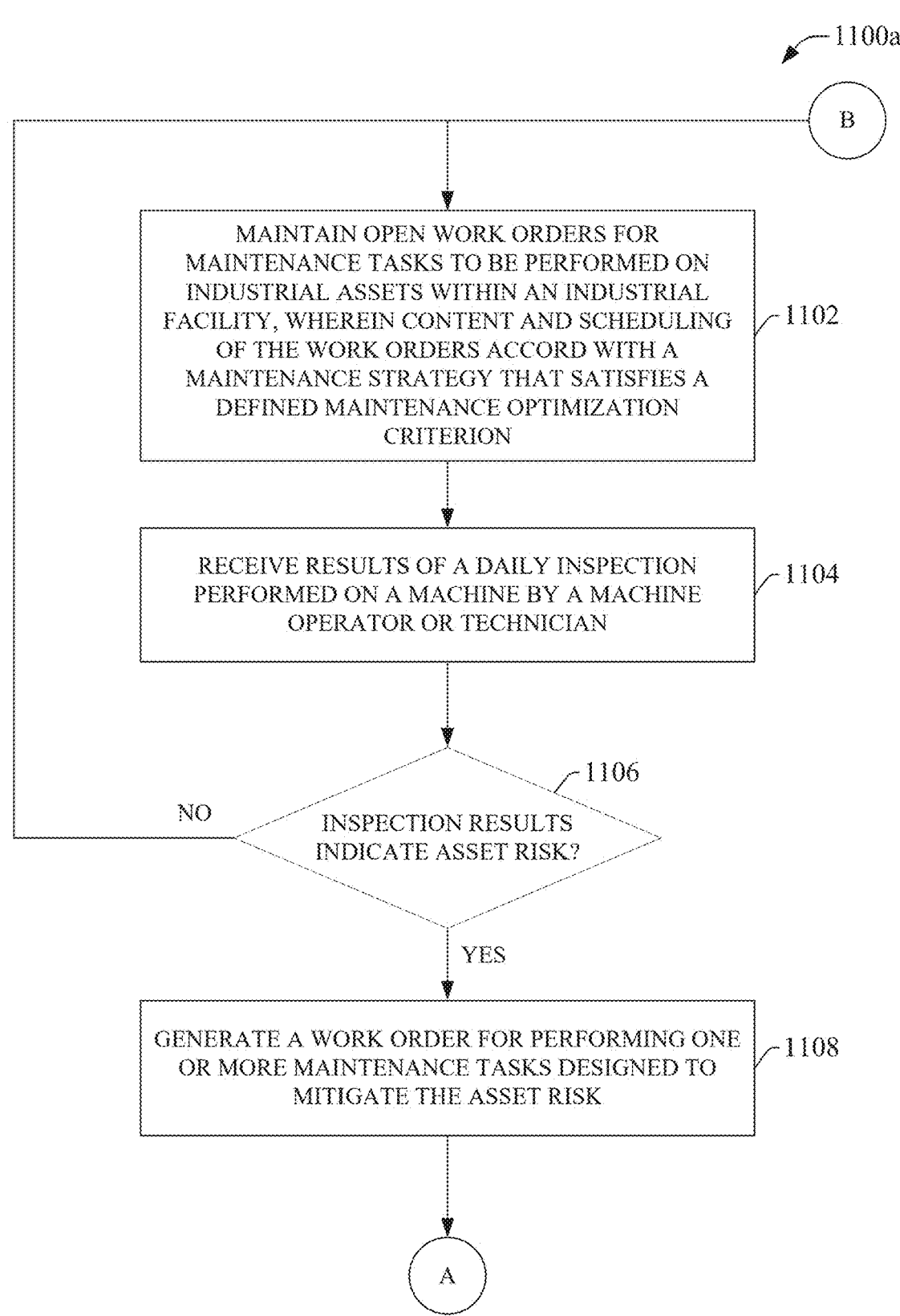
FIG. 11a is a flowchart of a first part of an example methodology for dynamically adjusting open work orders in response to results of machine inspections carried out by machine operators or technicians.
Figure 11B:
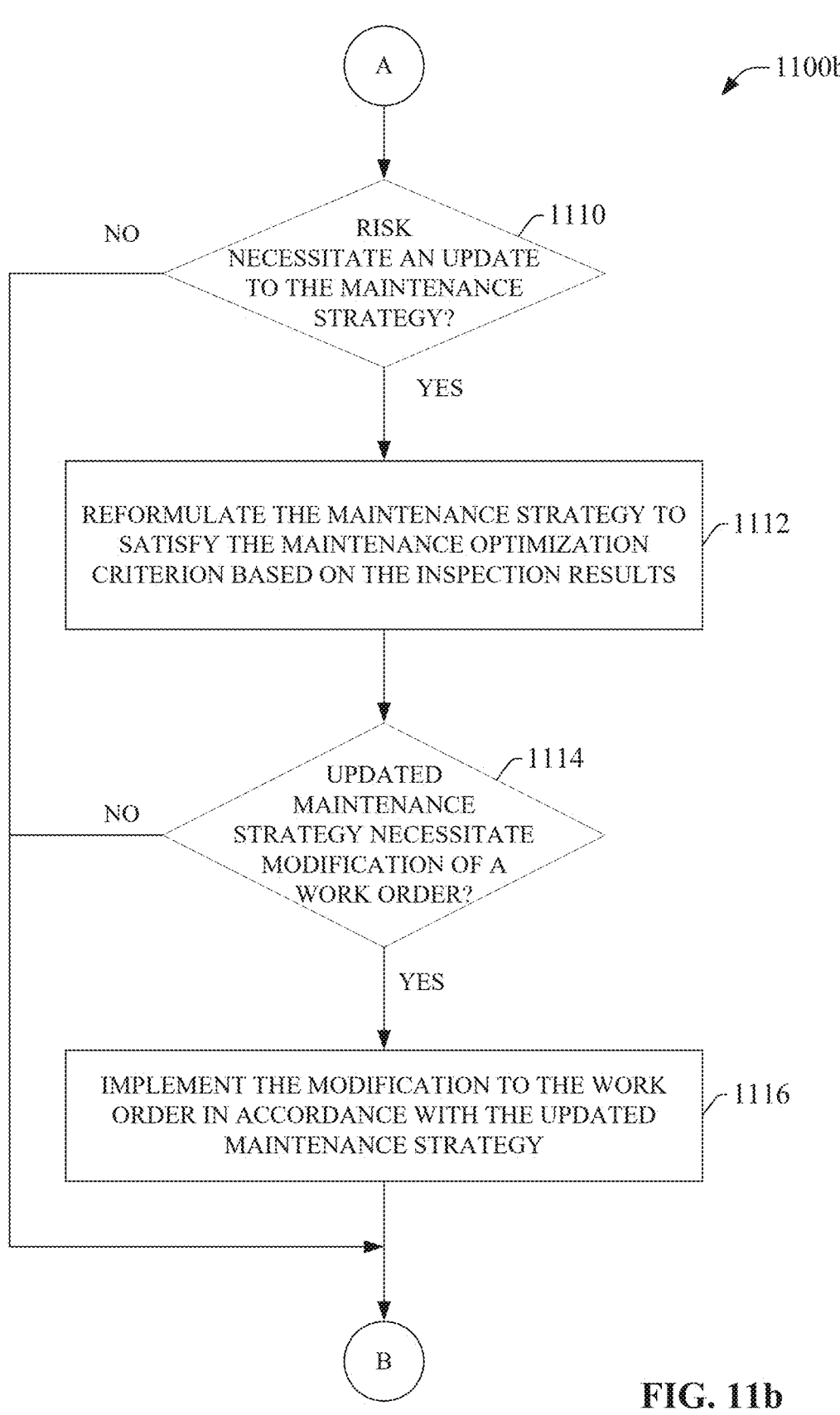
FIG. 11b is a flowchart of a second part of the example methodology for dynamically adjusting open work orders in response to results of machine inspections carried out by machine operators or technicians.

FIGS. 11a-11b illustrate an example methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 11a illustrates a first part of an example methodology 1100a for dynamically adjusting open work orders in response to results of machine inspections carried out by machine operators or technicians. Initially, at 1102, open work orders are maintained for maintenance tasks to be performed on industrial assets within an industrial facility. The work orders can be maintained and managed on a work order management system that creates, schedules, manages, and tracks work orders for industrial clients. The content and schedules of the work orders accord with a maintenance strategy that satisfies a defined maintenance optimization criterion. The maintenance optimization criterion can be, for example, a requirement to execute the maintenance tasks of the new and currently open work orders in a manner that maximizes overall maintenance efficiency, minimizes the total time to execute the work orders, minimizes labor or material costs associated with execution of the work orders, minimizes the number of technicians or autonomous vehicles required to complete the work orders, minimizes the number of steps taken by the technicians to complete the work orders, or other such criteria.

At 1104, results of a daily inspection performed on an industrial machine or asset by a machine operator or technician are received. In some scenarios, the daily inspection may be part of a daily scheduled work order for routine inspections to be performed on the machine by the machine's operator prior to beginning his or her shift, or by plant technicians as part of their daily risk prevention inspections. The operators or technicians can submit results of these inspections to the work order management system via interaction with a user interface rendered by the system, and these results can be stored as part of the corresponding work orders. Alternatively, these inspections can be performed without a work order, and the work order management system can process the inspection results without those results being associated with a specific work order.

At 1106, a determination is made as to whether the inspection results received at step 1104 are indicative of a performance risk to the inspected machine. If the inspection results are not indicative of a performance risk (NO at step 1106) the methodology returns to step 1102. Alternatively, if the inspection results are indicative of a performance risk (YES at step 1106), the methodology proceeds to step 1108, where a work order for performing one or more maintenance tasks designed to mitigate the asset risk indicated at step 1106 is generated by the work order management system.

The methodology then proceeds to the second part 1100b illustrated in FIG. 11b. At 1110, a determination is made as to whether the performance risk indicated by the inspection results necessitates an update to the overall maintenance strategy in order to satisfy, or better satisfy, the maintenance optimization criterion in view of the maintenance tasks required to address the detected performance risk. If no such change is necessary (NO at step 1110), the methodology returns to step 1102. Alternatively, if a change to the maintenance strategy is deemed necessary (YES at step 1110), the methodology proceeds step 1112, where the maintenance strategy is reformulated to satisfy the maintenance optimization criterion based on the detected performance risk and corresponding maintenance tasks associated with the work order generated at step 1108. In general, the maintenance strategy defines such factors as optimal schedules or relative priorities for performing the work orders and their associated maintenance tasks; optimal allocation of resources, tools, technicians, and time to the respective work orders; or other such factors. At 1114, a determination is made as to whether the updated maintenance strategy formulated at step 1112 necessitates a modification of an open work order in order to accord with the new strategy. If such a modification is necessary (YES at step 1114), the methodology proceeds to step 1116, where the modification to the work order is implemented in accordance with the updated maintenance strategy. Such modifications may include, for example, changing a priority level or scheduled completion time of the work order, changing a resource allocation of the work orders, or other such work order properties. If no modification is required in order to align the work orders with the updated maintenance strategy (NO at step 1114), step 1116 is skipped.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 12:
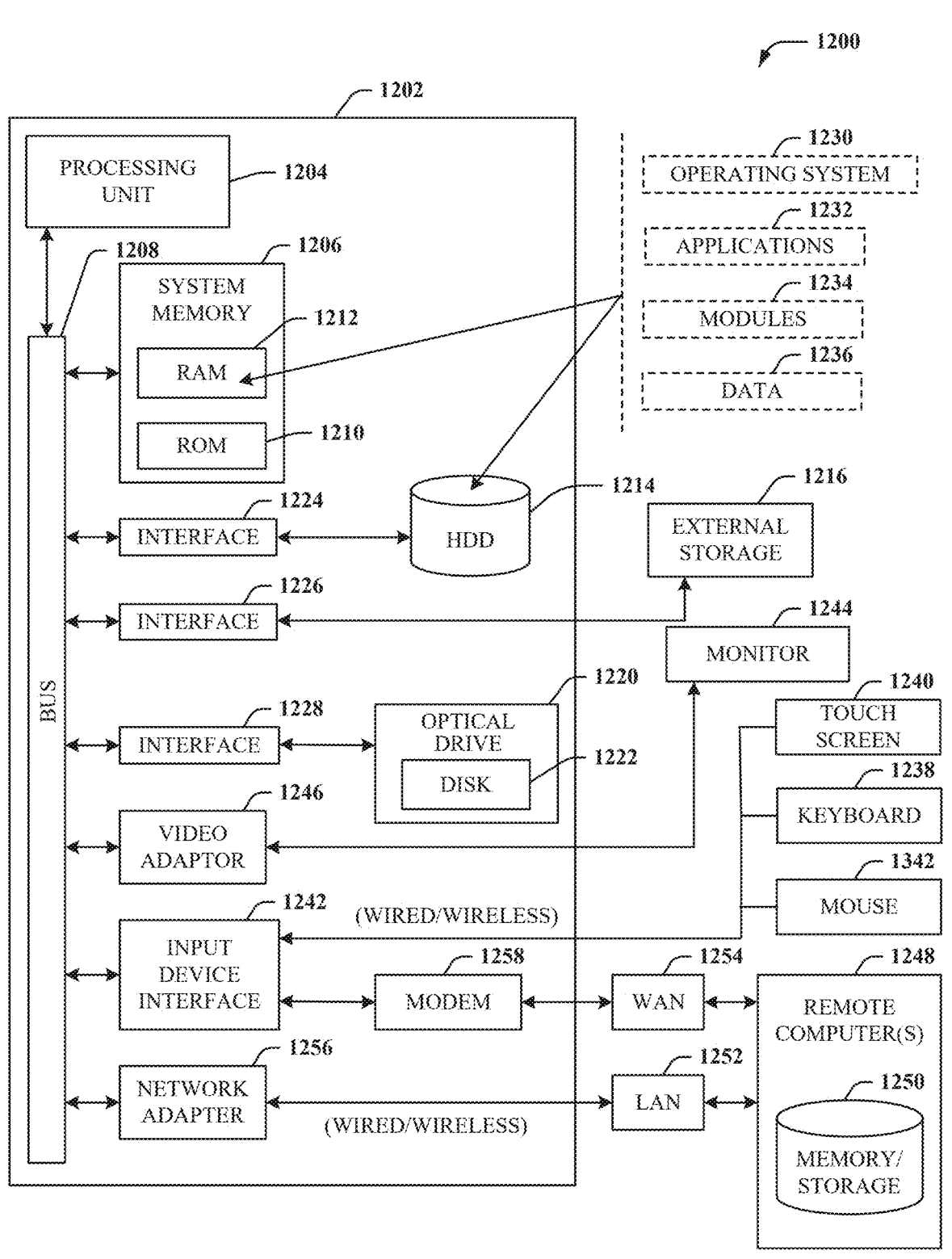
FIG. 12 is an example computing environment.
Figure 13:
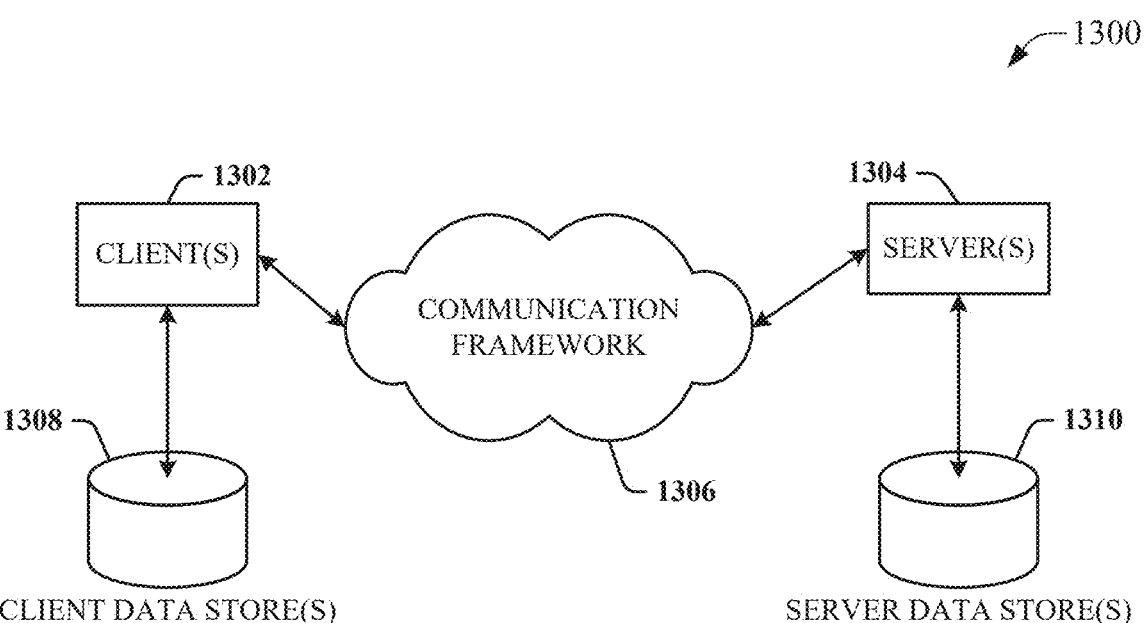
FIG. 13 is an example networking environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12 the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for application programs 1232. Runtime environments are consistent execution environments that allow application programs 1232 to run on any operating system that includes the runtime environment. Similarly, operating system 1230 can support containers, and application programs 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the adapter 1256 in a wireless mode.

When used in a WAN networking environment, the computer 1202 can include a modem 1258 or can be connected to a communications server on the WAN 1254 via other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1252 or WAN 1254 e.g., by the adapter 1256 or modem 1258, respectively. Upon connecting the computer 1202 to an associated cloud storage system, the external storage interface 1226 can, with the aid of the adapter 1256 and/or modem 1258, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components and work order data defining open work orders for performing maintenance tasks on industrial assets within an industrial facility; and
a processor, operatively coupled to the memory, that executes the executable components, the executable components comprising:
a user interface configured to receive, via interaction with a user interface rendered by the user interface component, inspection result data indicating results of an inspection performed on an industrial machine within the industrial facility;
an analysis component configured to, in response to determining that the inspection result data is indicative of a performance risk associated with the industrial machine, formulate one or more maintenance tasks designed to mitigate the performance risk; and
a work order generation component configured to generate a first work order to perform the one or more maintenance tasks and add the first work order to the open work orders,
wherein
the analysis component is further configured to, in response to generation of the first work order, determine, based on the one or more maintenance tasks, a modification to a second work order, of the open work orders, that causes the open work orders to implement a holistic maintenance strategy that satisfies defined maintenance optimization criteria, wherein the defined maintenance optimization criteria comprises at least minimization of a number of technicians required to execute the open work orders, the work order generation component is further configured to implement the modification to the second work order, and the analysis component is further configured to formulate and submit, based on the one or more maintenance tasks defined by the first work order, a prompt to a generative artificial intelligence (AI) model designed to obtain a response from the generative AI model used to determine the modification to the second work order.

2. The system of claim 1, wherein the modification is at least one of a change to a priority level of the second work order, a change to a completion date of the second work order, a change to a scheduled time to perform maintenance tasks defined by the second work order, a change to an assignment of technicians to the second work order, or a change to a resource allocation for the second work order.

3. The system of claim 1, wherein the inspection is at least one of a visual or tactile inspection of a component of the industrial machine, a test of manual or semi-automatic machine controls, a verification that a pathway for material or parts processed by the industrial machine is clear of obstructions, a machine safety check, or a fluid level check.

4. The system of claim 1, wherein the defined maintenance optimization criteria further comprises at least one of maximization of overall maintenance efficiency, minimization of a total time to execute the open work orders, minimization of labor or material costs associated with execution of the open work orders, minimization of a number of autonomous vehicles required to execute the open work orders, or minimization of a number of steps taken by the technicians to complete the open work orders.

5. The system of claim 1, further comprising a monitoring component configured to monitor industrial asset data generated by the industrial assets, wherein the industrial asset data comprises operational and status information for the industrial assets, wherein the analysis component is further configured to, in response to a determination, based on analysis of the industrial asset data, that a subset of the industrial asset data satisfies a condition indicative of a current or predicted risk to a first industrial asset of the industrial assets, formulate a maintenance task predicted to mitigate the current or predicted risk, and the work order generation component is configured to, in response to the determination by the analysis component that the subset of the industrial data satisfies the condition, generate another work order prescribing the maintenance task.

6. The system of claim 1, further comprising a monitoring component is further configured to monitor schedule data that records current work schedules for technicians, wherein the analysis component is further configured to, in response to detecting, based on analysis of the schedule data, a change in a scheduled availability of one or more of the technicians, determine another modification to an open work order, of the open work orders, that causes the holistic maintenance strategy implemented by the open work orders to satisfy the defined maintenance optimization criteria based on the change in the scheduled availability, and the work order generation component is further configured to implement the other modification on the open work order.

7. The system of claim 1, wherein further comprising a monitoring component is further configured to monitor inventory data that records current inventory levels of parts or materials used to perform maintenance tasks, wherein the analysis component is further configured to, in response to detecting, based on analysis of the inventory data, a change in the current inventory levels, determine another modification to an open work order, of the open work orders, that causes the holistic maintenance strategy implemented by the open work to satisfy the defined maintenance optimization criteria based on the change in the current inventory levels, and the work order generation component is further configured to implement the other modification to the open work order.

8. The system of claim 1, wherein the analysis component is configured to determine the modification to the open work order based on a model trained with training data comprising at least one of technical specification data for the industrial assets, information from past work orders that were generated for the industrial assets, historical operational or status data for the industrial assets, information about technicians employed by the plant facility, or financial data for the plant facility.

9. The system of claim 8, wherein the analysis component is configured to formulate the prompt further based on content of the model.

10. A method, comprising:

maintaining, by a system comprising a processor, open work orders for performing maintenance tasks on industrial assets within an industrial facility;

receiving, by the system via interaction with a user interface, inspection result data indicating results of an inspection performed on an industrial machine within the industrial facility; and in response to determining that the inspection result data is indicative of a performance risk associated with the industrial machine:

formulating, by the system, one or more maintenance tasks designed to mitigate the performance risk;

generating, by the system, a first work order to perform the one or more maintenance tasks and adding the first work order to the open work orders;

in response to the generating of the first work order, determining, by the system based on the one or more maintenance tasks, a modification to a second work order, of the open work orders, that causes the open work orders to implement a holistic maintenance strategy that satisfies defined maintenance optimization criteria, wherein the defined maintenance optimization criteria comprise at least minimization of a number of technicians required to execute the open work orders, and the determining comprises formulating and submitting, based on the one or more maintenance tasks defined by the first work order, a prompt to a generative artificial intelligence (AI) model designed to obtain a response from the generative AI model used to determine the modification to the second work order; and

implementing, by the system, the modification to the second work order.

11. The method of claim 10, wherein the modification is at least one of a change to a priority level of the second work order, a change to a completion date of second open work order, a change to a scheduled time to perform maintenance tasks defined by the second work order, a change to an assignment of technicians to the second work order, or a change to a resource allocation for the second work order.

12. The method of claim 10, wherein the inspection is at least one of a visual or tactile inspection of a component of the industrial machine, a test of manual or semi-automatic machine controls, a verification that a pathway for material or parts processed by the industrial machine is clear of obstructions, a machine safety check, or a fluid level check.

13. The method of claim 10, wherein the defined maintenance optimization criteria further comprise at least one of maximization of overall maintenance efficiency, minimization of a total time to execute the open work orders, minimization of labor or material costs associated with execution of the open work orders, minimization of a number of autonomous vehicles required to execute the open work orders, or minimization of a number of steps taken by the technicians to complete the open work orders.

14. The method of claim 10, further comprising:
monitoring, by the system, industrial asset data generated by the industrial assets, wherein the industrial asset data comprises operational and status information for the industrial assets; and
in response to determining, based on analysis of the industrial asset data, that a subset of the industrial asset data satisfies a condition indicative of a current or predicted risk to a first industrial asset of the industrial assets:
formulating, by the system, a maintenance task predicted to mitigate the current or predicted risk; and
generating, by the system, another work order prescribing the maintenance task.

15. The method of claim 10, further comprising:
monitoring, by the system, schedule data that records current work schedules for technicians; and
in response to detecting, based on analysis of the schedule data, a change in a scheduled availability of one or more of the technicians:
determining, by the system, another modification to an open work order, of the open work orders, that causes the holistic maintenance strategy implemented by the open work orders to satisfy the defined maintenance optimization criteria based on the change in the scheduled availability; and
implementing, by the system, the other modification to the open work order.

16. The method of claim 10, further comprising:
monitoring, by the system, inventory data that records current inventory levels of parts or materials used to perform maintenance tasks; and
in response to detecting, based on analysis of the inventory data, a change in the current inventory levels:
determining, by the system, another modification to an open work order, of the open work orders, that causes the holistic maintenance strategy implemented by the open work orders to satisfy the defined maintenance optimization criteria based on the change in the current inventory levels; and

implementing, by the system, the other modification to the open work order.

17. The method of claim 10, wherein the determining of the modification to the second work order further comprises determining of the modification to the second work order based on a model trained with training data comprising at least one of technical specification data for the industrial assets, information from past work orders that were generated for the industrial assets, historical operational or status data for the industrial assets, information about technicians employed by the industrial facility, or financial data for the industrial facility.

18. The method of claim 17, wherein the formulating of the prompt comprises formulating the prompt further based on content of the model.

19. A non-transitory computer-readable medium having stored thereon instructions that, in response to execution, cause a work order management system comprising a processor to perform operations, the operations comprising:
maintaining open work orders for performing maintenance tasks on industrial assets within an industrial facility;
receiving, via interaction with a user interface rendered by the user interface component, inspection result data indicating results of an inspection performed on an industrial machine within the industrial facility; and
in response to determining that the inspection result data is indicative of a performance risk associated with the industrial machine:
formulating one or more maintenance tasks designed to mitigate the performance risk;
generating a first work order to perform the one or more maintenance tasks and adding the first work order to the open work orders;
in response to the generating of the first work order, determining a modification to a second work order, of the open work orders, that causes the open work orders to implement a holistic maintenance strategy that satisfies defined maintenance optimization criteria, wherein
the defined maintenance optimization criteria comprise at least minimization of a number of technicians required to execute the open work orders, and
the determining of the modification comprises formulating and submitting, based on the one or more maintenance tasks defined by the first work order, a prompt to a generative artificial intelligence (AI) model designed to obtain a response from the generative AI model used to determine the modification to the second work order; and
implementing the modification to the second work order.

20. The non-transitory computer-readable medium of claim 19, wherein the modification is at least one of a change to a priority level of the second work order, a change to a completion date of the second work order, a change to a scheduled time to perform maintenance tasks defined by the second work order, a change to an assignment of technicians to the second work order, or a change to a resource allocation for the second work order.

* * * * *